(12) United States Patent
Mullin et al.

(10) Patent No.: US 11,998,056 B2
(45) Date of Patent: Jun. 4, 2024

(54) ELECTRONIC VAPOR PROVISION SYSTEM

(71) Applicant: NICOVENTURES HOLDINGS LIMITED, London (GB)

(72) Inventors: Martin Conrad Mullin, London (GB); Thomas P. Blandino, Madison, WI (US); Bob Schofield, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 414 days.

(21) Appl. No.: 16/623,501

(22) PCT Filed: Jun. 20, 2018

(86) PCT No.: PCT/GB2018/051713
§ 371 (c)(1),
(2) Date: Dec. 17, 2019

(87) PCT Pub. No.: WO2018/234792
PCT Pub. Date: Dec. 27, 2018

(65) Prior Publication Data
US 2021/0145072 A1    May 20, 2021

(30) Foreign Application Priority Data
Jun. 22, 2017 (GB) ..................... 1709982

(51) Int. Cl.
*A24F 40/50* (2020.01)
*A24F 40/40* (2020.01)
(Continued)

(52) U.S. Cl.
CPC .............. *A24F 40/50* (2020.01); *A24F 40/40* (2020.01); *A24F 40/53* (2020.01); *A24F 40/57* (2020.01); *A24F 40/10* (2020.01); *A24F 40/51* (2020.01)

(58) Field of Classification Search
CPC ........... A24F 40/50; A24F 40/51; A24F 40/57
See application file for complete search history.

(56) References Cited

U.S. PATENT DOCUMENTS 4,028,689 A * 6/1977 Schopp .................. G01F 1/684
73/204.22
6,095,153 A    8/2000 Kessler
(Continued)

FOREIGN PATENT DOCUMENTS

| CN | 104770884 | 7/2015 |
| CN | 105029713 | 11/2015 |

(Continued)

OTHER PUBLICATIONS

Thermistors, Oct. 2018 (downloaded online on Sep. 22, 2023 from https://www.electronics-tutorials.ws/io/thermistors.html (Year: 2018).*
(Continued)

*Primary Examiner* — Anthony Calandra
(74) *Attorney, Agent, or Firm* — Husch Blackwell LLP

(57) ABSTRACT

An electronic vapor provision system including: a vaporizer for vaporizing aerosol precursor material for inhalation by a user of the electronic vapor provision system; a power supply for supplying power to the vaporizer; a wall defining an air flow path along which air travels through the electronic vapor provision system when a user inhales or exhales on the electronic vapor provision system; a temperature sensor mounted in the air flow path adjacent a portion of the wall of the air flow path; and a controller configured to cause power to be supplied to the temperature sensor to heat the temperature sensor and to cause power to be supplied to the vaporizer to vaporize the aerosol precursor material in response to detecting a change in temperature of the temperature sensor; wherein the air flow path is arranged such that, during inhalation or exhalation by the user, air travelling along the air flow path is directed at the temperature (Continued)

sensor in a direction that is towards the portion of the wall adjacent to which the temperature sensor is mounted so as to disrupt the airflow around the temperature sensor.

21 Claims, 10 Drawing Sheets

(51) Int. Cl.
*A24F 40/51* (2020.01)
*A24F 40/53* (2020.01)
*A24F 40/57* (2020.01)
*A24F 40/10* (2020.01)

(56) References Cited

U.S. PATENT DOCUMENTS

| | | | |
|---|---|---|---|
| 10,314,339 | B2 | 6/2019 | Fraser |
| 11,160,312 | B2* | 11/2021 | Akao ................ A24F 40/53 |
| 2002/0017299 | A1 | 2/2002 | Hickle |
| 2003/0226837 | A1 | 12/2003 | Blake |
| 2004/0168513 | A1 | 9/2004 | Aoshima et al. |
| 2009/0216910 | A1 | 8/2009 | Duchesneau |
| 2011/0226236 | A1 | 9/2011 | Buchberger |
| 2013/0230755 | A1 | 9/2013 | Dimmock |
| 2013/0240385 | A1 | 9/2013 | Loehrke et al. |
| 2014/0130796 | A1 | 5/2014 | Liu |
| 2014/0212703 | A1 | 7/2014 | Kobori et al. |
| 2014/0249601 | A1 | 9/2014 | Bachinski et al. |
| 2014/0299125 | A1* | 10/2014 | Buchberger ........ A61M 11/041 514/343 |
| 2014/0301721 | A1 | 10/2014 | Ruscio |
| 2014/0316630 | A1 | 10/2014 | Kohlberger et al. |
| 2015/0114409 | A1 | 4/2015 | Brammer |
| 2015/0320116 | A1 | 11/2015 | Bleloch et al. |
| 2016/0157524 | A1* | 6/2016 | Bowen .................. A24F 40/57 702/50 |
| 2016/0213066 | A1 | 7/2016 | Zitzke et al. |
| 2016/0235124 | A1* | 8/2016 | Krietzman .......... H05B 1/0225 |
| 2017/0013879 | A1 | 1/2017 | Frisbee |
| 2017/0175657 | A1 | 6/2017 | Fei et al. |
| 2017/0207499 | A1 | 7/2017 | Leadley |
| 2017/0250552 | A1 | 8/2017 | Qiuming |
| 2017/0251718 | A1 | 9/2017 | Armoush et al. |
| 2018/0049469 | A1* | 2/2018 | Kaufman ............... A61M 15/06 |
| 2018/0256834 | A1 | 9/2018 | Hepworth |
| 2018/0303161 | A1* | 10/2018 | Bilat .................. A24F 40/53 |
| 2019/0020012 | A1 | 1/2019 | Ju et al. |

FOREIGN PATENT DOCUMENTS

| | | |
|---|---|---|
| CN | 105376877 A | 3/2016 |
| CN | 105852224 A | 8/2016 |
| CN | 106418724 A | 2/2017 |
| DE | 202014101125 | 3/2014 |
| DE | 202014101126 | 4/2014 |
| GB | 2528711 | 2/2016 |
| JP | 2004212102 A | 7/2004 |
| JP | 2012138284 A | 7/2012 |
| JP | 2012527222 A | 11/2012 |
| JP | 2014508653 A | 4/2014 |
| JP | 2015513922 A | 5/2015 |
| JP | 2016045718 A | 4/2016 |
| JP | 2017518751 A | 7/2017 |
| JP | 2018510630 A | 4/2018 |
| KR | 20130108825 A | 10/2013 |
| WO | WO2014144678 | 9/2014 |
| WO | WO 2015/038981 | 3/2015 |
| WO | WO-2015189556 A1 | 12/2015 |
| WO | WO2016058189 | 4/2016 |
| WO | WO 2016/156217 | 10/2016 |
| WO | WO-2017055793 A1 | 4/2017 |

OTHER PUBLICATIONS

Application and File History for U.S. Appl. No. 16/610,588, filed Nov. 4, 2019, Inventor: Otiaba et al.
International Search Report, Application No. PCT/GB2018/051713, dated Sep. 27, 2018, 3 pages.
Russian Decision to Grant, Application No. 2019142742, dated Apr. 21, 2020, 12 pages.
International Preliminary Report on Patentability, Application No. PCT/GB2018/051159, dated Nov. 14, 2019, 8 pages.
International Search Report and Written Opinion, Application No. PCT/GB2018/051159, dated Jul. 27, 2018, 22 pages.
International Preliminary Report on Patentability, Application No. PCT/GB2018/051713, dated Jan. 2, 2020.
Great Britain Search Report, Application No. GB1709982.1, dated Feb. 13, 2018, 3 pages.
Application and File History for U.S. Appl. No. 16/623,501, filed Dec. 17, 2019, Inventor: Mullin et al.
Decision to Grant a Patent dated Mar. 9, 2021 for Japanese Application No. 2019-560111, 5 pages.
Notice of Allowance dated Apr. 19, 2022 for Korean Application No. 10-2019-7037656, 3 pages.
Office Action for Chinese Application No. 201880028893.7, dated Nov. 2, 2021, 17 pages.
Office Action for Japanese Application No. 2019-566878, dated May 11, 2021, 18 pages.
Office Action dated Apr. 29, 2021 for Korean Application No. 10-2019-7032197, 21 pages.
Search Report dated Mar. 1, 2021 for Japanese Application No. 2019-566878, 24 pages.
Search Report dated Feb. 22, 2021 for Japanese Application No. 2019-560111, 24 pages.

* cited by examiner

ELECTRONIC VAPOR PROVISION SYSTEM

PRIORITY CLAIM

The present application is a National Phase entry of PCT Application No. PCT/GB2018/051713, filed Jun. 20, 2018, which claims priority from Great Britain Patent Application No. 1709982.1, filed Jun. 22, 2017, which is hereby fully incorporated herein by reference.

FIELD

The present disclosure relates to electronic vapor provision systems such as electronic nicotine delivery systems (e.g. e-cigarettes).

BACKGROUND

Electronic vapor provision systems such as e-cigarettes generally contain a reservoir of aerosol precursor material such as a liquid, typically comprising nicotine, which is to be vaporized or otherwise converted into an aerosol. Such devices are usually provided with one or more air inlet holes located away from the mouthpiece. When a user sucks (inhales) on the mouthpiece, air is drawn in through the inlet holes and past the vapor source, such as a heater supplied with liquid from a cartridge.

Some e-cigarettes are provided with a specific manual activation facility, such as a button which is used to activate the heater. In such devices, the heater is only activated when the specific manual activation facility is activated (e.g. while the user is holding down the button). Another approach adopted by some devices is to have the heater activated automatically by an airflow sensor (such as a pressure drop sensor) which detects airflow through the device as the user inhales on the device. More particularly, when a user inhales on the device, the heater is activated to vaporize a small amount of liquid, which is therefore inhaled by the user.

The problem with such approaches, however, is that use of a component such as a specific manual activation facility or airflow sensor results in relatively costly manufacture of the e-cigarette.

SUMMARY

The present technique provides an electronic vapor provision system comprising: a vaporizer for vaporizing aerosol precursor material for inhalation by a user of the electronic vapor provision system; a power supply for supplying power to the vaporizer; a wall defining an air flow path along which air travels through the electronic vapor provision system when a user inhales or exhales on the electronic vapor provision system; a temperature sensor mounted in the air flow path adjacent a portion of the wall of the air flow path; and a controller configured to cause power to be supplied to the temperature sensor to heat the temperature sensor and to cause power to be supplied to the vaporizer to vaporize the aerosol precursor material in response to detecting a change in temperature of the temperature sensor; wherein the air flow path is arranged such that, during inhalation or exhalation by the user, air travelling along the air flow path is directed at the temperature sensor in a direction that is towards the portion of the wall adjacent to which the temperature sensor is mounted so as to disrupt the airflow around the temperature sensor.

In an embodiment, the air flow path is arranged such that, when the user inhales on the electronic vapor provision system, air travels through the air flow path and is directed at the temperature sensor in a direction that is towards the portion of the wall adjacent to which the temperature sensor is mounted so as to disrupt the airflow around the temperature sensor and, when the user exhales on the electronic vapor provision system, air travels through the air flow path and is not directed at the temperature sensor in a direction that is towards the portion of the wall adjacent to which the temperature sensor is mounted so as to disrupt the airflow around the temperature sensor, and the controller is configured to cause power to be supplied to the vaporizer to vaporize the aerosol precursor material only when one of an amount of the detected change in temperature of the temperature sensor or the rate of the detected change in temperature of the temperature sensor exceeds a predetermined threshold; or the air flow path is arranged such that, when the user exhales on the electronic vapor provision system, air travels through the air flow path and is directed at the temperature sensor in a direction that is towards the portion of the wall adjacent to which the temperature sensor is mounted so as to disrupt the airflow around the temperature sensor and, when the user inhales on the electronic vapor provision system, air travels through the air flow path and is not directed at the temperature sensor in a direction that is towards the portion of the wall adjacent to which the temperature sensor is mounted so as to disrupt the airflow around the temperature sensor, and the controller is configured to cause power to be supplied to the vaporizer to vaporize the aerosol precursor material only when one of an amount of the detected change in temperature of the temperature sensor or the rate of the detected change in temperature of the temperature sensor is below a predetermined threshold.

In an embodiment, the electronic vapor provision system comprises: a further temperature sensor mounted in the air flow path adjacent a further portion of the wall of the air flow path; wherein: the air flow path is arranged such that: when the user exhales on the electronic vapor provision system, air travels through the air flow path and is not directed at the temperature sensor in a direction that is towards the portion of the wall adjacent to which the temperature sensor is mounted so as to disrupt the airflow around the temperature sensor and is directed at the further temperature sensor in a direction towards the further portion of the wall adjacent to which the further temperature sensor is mounted so as to disrupt the airflow around the further temperature sensor, and when the user inhales on the electronic vapor provision system, air travels through the air flow path and is directed at the temperature sensor in a direction that is towards the portion of the wall adjacent to which the temperature sensor is mounted so as to disrupt the airflow around the temperature sensor and is not directed at the further temperature sensor in a direction towards the further portion of the wall adjacent to which the further temperature sensor is mounted so as to disrupt the airflow around the further temperature sensor; and the controller is configured to: cause power to be supplied to the further temperature sensor to heat the further temperature sensor, and cause power to be supplied to the vaporizer to vaporize the aerosol precursor material only when one of an amount of a detected change in the temperature of the temperature sensor exceeds an amount of a detected change in the temperature of the further temperature sensor or a rate of a detected change in the temperature of the temperature sensor exceeds a rate of a detected change in the temperature of the further temperature sensor.

In an embodiment, upon initially detecting a change in the temperature of the temperature sensor, the controller is configured to cause power to be supplied to the vaporizer to vaporize the aerosol precursor material until the one of the amount of the detected change in the temperature of the temperature sensor or the rate of the detected change in the temperature of the temperature sensor has been determined.

In an embodiment, upon initially detecting a change in the temperature of one of the temperature sensor and further temperature sensor, the controller is configured to cause power to be supplied to the vaporizer to vaporize the aerosol precursor material until the one of the amount of the detected change in the temperature of the one of the temperature sensor and further temperature sensor or the rate of the detected change in the temperature of the one of the temperature sensor and further temperature sensor has been determined.

In an embodiment, the further temperature sensor is a thermistor. The thermistor may be a surface mount thermistor.

In an embodiment, the temperature sensor is a thermistor. The thermistor may be a surface mount thermistor.

In an embodiment, the controller is configured to control the amount of power supplied to the vaporizer to vaporize the aerosol precursor material based on one of an amount of the detected change in the temperature of the temperature sensor and a rate of the detected change in the temperature of the temperature sensor.

In an embodiment, wherein the controller is configured to control the amount of power supplied to the vaporizer to vaporize the aerosol precursor material based on one of an amount of the detected change in the temperature of one of the temperature sensor and further temperature sensor and a rate of the detected change in the temperature of the one of the temperature sensor and further temperature sensor.

In an embodiment, the controller is configured to further control the amount of power supplied to the vaporizer based on a value of the ambient temperature of the electronic vapor provision system.

In an embodiment, the controller is configured to detect the ambient temperature using the temperature sensor prior to causing power to be supplied to the temperature sensor to heat the temperature sensor.

In an embodiment, the controller is configured to further control the amount of power supplied to the vaporizer based on a value of the ambient temperature of the electronic vapor provision system.

In an embodiment, the controller is configured to detect the ambient temperature using one of the temperature sensor and further temperature sensor prior to causing power to be supplied to the one of the temperature sensor and further temperature sensor to heat the temperature sensor.

In an embodiment, the electronic vapor provision system comprises an independent ambient temperature sensor configured to measure the ambient temperature.

In an embodiment, the controller is configured to, upon causing power to stop being supplied to the vaporizer to vaporize the aerosol precursor material, cause power to stop being supplied to the temperature sensor to heat the temperature sensor for a predetermined time period.

In an embodiment, the controller is configured to, upon causing power to stop being supplied to the vaporizer to vaporize the aerosol precursor material, cause power to stop being supplied to one of the temperature sensor and further temperature sensor to heat the one of the temperature sensor and further temperature sensor for a predetermined time period.

In an embodiment, the vaporizer is a heater which is supplied with power from the power supply to heat and thereby vaporize the aerosol precursor material for inhalation by the user.

In an embodiment, the aerosol precursor material is a liquid comprising nicotine.

The present technique provides a method of operating an electronic vapor provision system comprising a vaporizer for vaporizing aerosol precursor material for inhalation by a user of the electronic vapor provision system, a power supply for supplying power to the vaporizer, a wall defining an air flow path along which air travels through the electronic vapor provision system when a user inhales or exhales on the electronic vapor provision system, and a temperature sensor mounted in the air flow path adjacent a portion of the wall of the air flow path, the method comprising: causing power to be supplied to the temperature sensor to heat the temperature sensor; and causing power to be supplied to the vaporizer to vaporize the aerosol precursor material in response to detecting a change in temperature of the temperature sensor; wherein the air flow path is arranged such that, during inhalation or exhalation by the user, air travelling along the air flow path is directed at the temperature sensor in a direction that is towards the portion of the wall adjacent to which the temperature sensor is mounted so as to disrupt the airflow around the temperature sensor.

The approach described herein is not restricted to specific embodiments such as set out below, but includes and contemplates any appropriate combinations of features presented herein. For example, an electronic vapor provision system may be provided in accordance with the approach described herein which includes any one or more of the various features described below as appropriate.

BRIEF DESCRIPTION OF THE DRAWINGS

Various embodiments of the disclosure will now be described in detail by way of example only with reference to the following drawings.

DETAILED DESCRIPTION

As described above, the present disclosure relates to an electronic vapor provision system, such as an e-cigarette.

Throughout the following description the term "e-cigarette" is used; however, this term may be used interchangeably with electronic vapor provision system.

Figure 1:
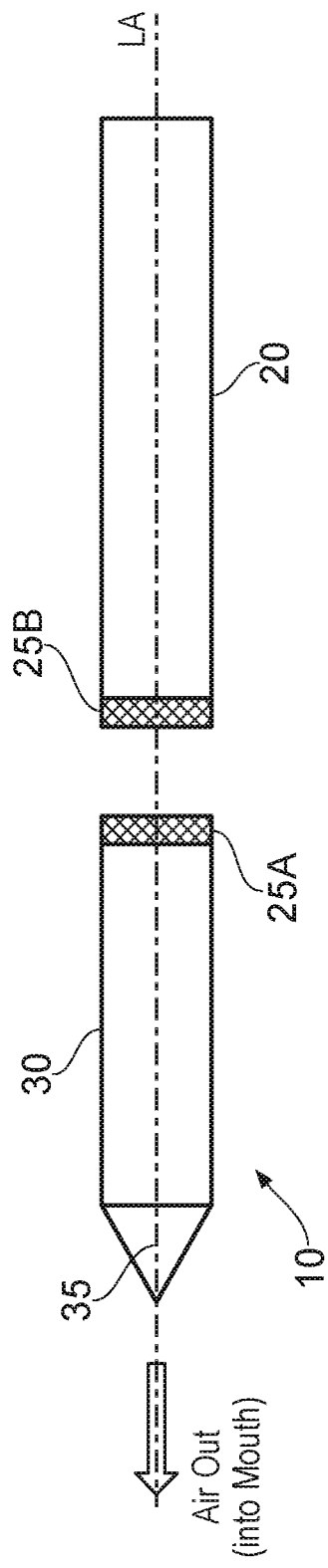
FIG. 1 is a schematic (exploded) diagram of an electronic vapor provision system such as an e-cigarette.

FIG. 1 is a schematic diagram of an electronic vapor provision system such as an e-cigarette 10 in accordance with some embodiments of the disclosure (not to scale). The e-cigarette has a generally cylindrical shape, extending along a longitudinal axis indicated by dashed line LA, and comprises two main components, namely a body 20 and a cartomizer 30. The cartomizer includes an internal chamber containing a reservoir of aerosol precursor material (such as a liquid comprising nicotine), a vaporizer (such as a heater), and a mouthpiece 35. The reservoir may comprise a foam matrix or any other structure for retaining the liquid until such time that it is required to be delivered to the vaporizer. Alternatively, the reservoir may not comprise any structure, such as foam, for retaining the liquid, but instead the liquid may be held freely in the reservoir. The vaporizer is for vaporizing the liquid, and the cartomizer 30 may further include a wick or similar facility to transport a small amount of liquid from the reservoir to a vaporizing location on or adjacent the vaporizer. In the following, a heater is used as a specific example of a vaporizer. However, it will be appreciated that other forms of vaporizer (for example, those which utilize ultrasonic waves) could also be used.

The body 20 includes a re-chargeable cell or battery to provide power to the e-cigarette 10 and a circuit board for generally controlling the e-cigarette. When the heater receives power from the battery, as controlled by the circuit board, the heater vaporizes the liquid and this vapor is then inhaled by a user through the mouthpiece 35.

The body 20 and cartomizer 30 are detachable from one another by separating in a direction parallel to the longitudinal axis LA, as shown in FIG. 1, but are joined together when the device 10 is in use by a connection, indicated schematically in FIG. 1 as 25A and 25B, to provide mechanical and electrical connectivity between the body 20 and the cartomizer 30. The electrical connector 25B on the body 20 that is used to connect to the cartomizer 30 also serves as a socket for connecting a charging device (not shown) when the body 20 is detached from the cartomizer 30. The other end of the charging device can be plugged into a USB socket to re-charge the cell in the body 20 of the e-cigarette 10. In other implementations, a cable may be provided for direct connection between the electrical connector 25B on the body 20 and a USB socket. Charging may also be effected by other means, such as via inductive wireless charging.

The e-cigarette 10 is provided with one or more holes (not shown in FIG. 1) for air inlet. These holes connect to an air passage through the e-cigarette 10 to the mouthpiece 35. When a user inhales through the mouthpiece 35, air is drawn into this air passage through the one or more air inlet holes, which are suitably located on the outside of the e-cigarette. This airflow is detected by way of a heatable temperature sensor (to be explained) that in turn activates the heater to vaporize the liquid from the cartridge. The airflow passes through, and combines with, the vapor, and this combination of airflow and vapor then passes out of the mouthpiece 35 to be inhaled by a user. The cartomizer 30 may be detached from the body 20 and disposed of when the supply of liquid is exhausted (and replaced with another cartomizer if so desired).

It will be appreciated that the e-cigarette 10 shown in FIG. 1 is presented by way of example, and various other implementations can be adopted. For example, in some embodiments, the cartomizer 30 is provided as two separable components, namely a cartridge comprising the liquid reservoir and mouthpiece (which can be replaced when the liquid from the reservoir is exhausted), and a vaporizer comprising a heater (which is generally retained). As another example, the charging facility may connect to an additional or alternative power source, such as a car cigarette lighter.

Figure 2:
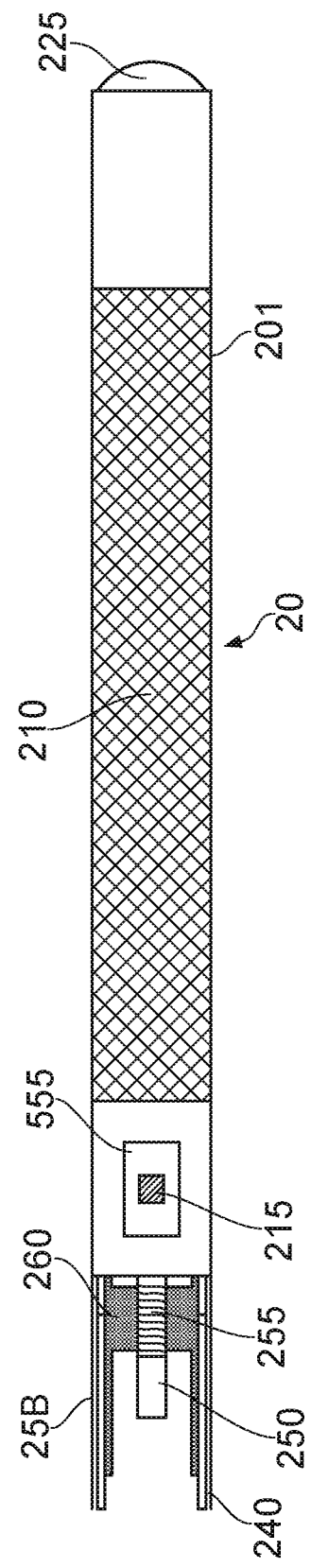
FIG. 2 is a schematic diagram of the body of the e-cigarette of FIG. 1.

FIG. 2 is a schematic (simplified) diagram of the body 20 of the e-cigarette 10 of FIG. 1 in accordance with some embodiments of the disclosure. FIG. 2 can generally be regarded as a cross-section in a plane through the longitudinal axis LA of the e-cigarette 10. Note that various components and details of the body, e.g. such as wiring and more complex shaping, have been omitted from FIG. 2 for reasons of clarity.

The body 20 includes a battery or cell 210 for powering the e-cigarette 10, as well as a chip 555, such as an application specific integrated circuit (ASIC) or microcontroller for controlling the e-cigarette 10. The ASIC 555 is attached to a heatable temperature sensor 215 to detect an inhalation on mouthpiece 35 (or alternatively the heatable temperature sensor 215 may be provided on the ASIC 555 itself).

The body 20 further includes a cap 225 to seal and protect the far (distal) end of the e-cigarette 10.

At the opposite end of the body 20 from the cap 225 is the connector 25B for joining the body 20 to the cartomizer 30. The connector 25B provides mechanical and electrical connectivity between the body 20 and the cartomizer 30. The connector 25B includes a body connector 240, which is metallic (silver-plated in some embodiments) to serve as one terminal for electrical connection (positive or negative) to the cartomizer 30. The connector 25B further includes an electrical contact 250 to provide a second terminal for electrical connection to the cartomizer 30 of opposite polarity to the first terminal, namely body connector 240. The electrical contact 250 is mounted on a coil spring 255. When the body 20 is attached to the cartomizer 30, the connector 25A on the cartomizer 30 pushes against the electrical contact 250 in such a manner as to compress the coil spring in an axial direction, i.e. in a direction parallel to (co-aligned with) the longitudinal axis LA. In view of the resilient nature of the spring 255, this compression biases the spring 255 to expand, which has the effect of pushing the electrical contact 250 firmly against connector 25A of the cartomizer 30, thereby helping to ensure good electrical connectivity between the body 20 and the cartomizer 30. The body connector 240 and the electrical contact 250 are separated by a trestle 260, which is made of a non-conductor (such as plastic) to provide good insulation between the two electrical terminals. The trestle 260 is shaped to assist with the mutual mechanical engagement of connectors 25A and 25B.

Figure 3:
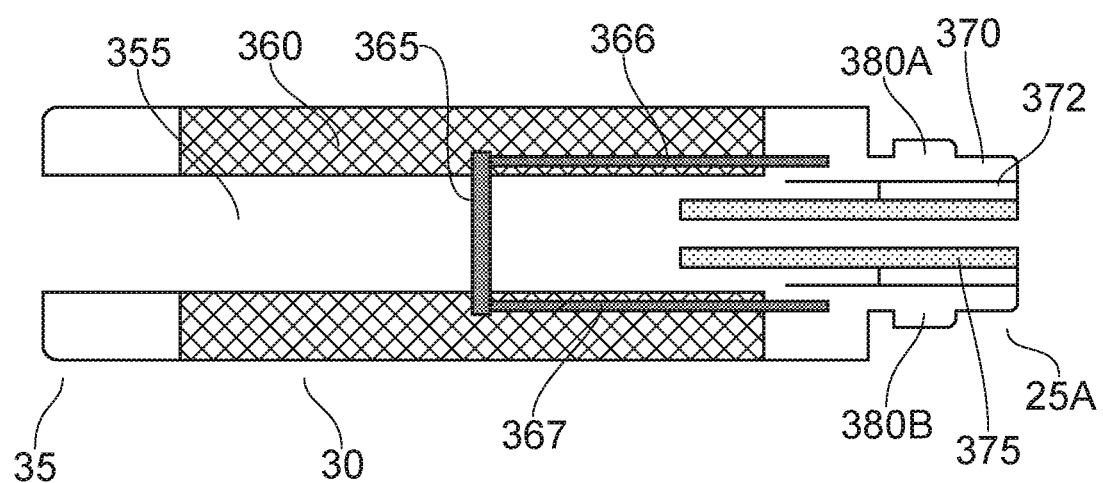
FIG. 3 is a schematic diagram of the vaporizer portion of the e-cigarette of FIG. 1.

FIG. 3 is a schematic diagram of the cartomizer 30 of the e-cigarette 10 of FIG. 1 in accordance with some embodiments of the disclosure. FIG. 3 can generally be regarded as a cross-section in a plane through the longitudinal axis LA of the e-cigarette 10. Note that various components and details of the cartomizer 30, such as wiring and more complex shaping, have been omitted from FIG. 3 for reasons of clarity.

The cartomizer 30 includes an air passage 355 extending along the central (longitudinal) axis of the cartomizer 30 from the mouthpiece 35 to the connector 25A for joining the cartomizer 30 to the body 20. A reservoir of liquid 360 is provided around the air passage 335. This reservoir 360 may be implemented, for example, by providing cotton or foam soaked in liquid. The cartomizer 30 also includes a heater 365 for heating liquid from reservoir 360 to generate vapor to flow through air passage 355 and out through mouthpiece 35 in response to a user inhaling on the e-cigarette 10. The heater 365 is powered through lines 366 and 367, which are in turn connected to opposing polarities (positive and negative, or vice versa) of the battery 210 of the main body 20 via connector 25A (the details of the wiring between the power lines 366 and 367 and connector 25A are omitted from FIG. 3).

The connector 25A includes an inner electrode 375, which may be silver-plated or made of some other suitable metal or conducting material. When the cartomizer 30 is connected to the body 20, the inner electrode 375 contacts the electrical contact 250 of the body 20 to provide a first electrical path between the cartomizer 30 and the body 20. In particular, as the connectors 25A and 25B are engaged, the inner electrode 375 pushes against the electrical contact 250 so as to compress the coil spring 255, thereby helping to ensure good electrical contact between the inner electrode 375 and the electrical contact 250.

The inner electrode 375 is surrounded by an insulating ring 372, which may be made of plastic, rubber, silicone, or any other suitable material. The insulating ring is surrounded by the cartomizer connector 370, which may be silver-plated or made of some other suitable metal or conducting material. When the cartomizer 30 is connected to the body 20, the cartomizer connector 370 contacts the body connector 240 of the body 20 to provide a second electrical path between the cartomizer 30 and the body 20. In other words, the inner electrode 375 and the cartomizer connector 370 serve as positive and negative terminals (or vice versa) for supplying power from the battery 210 in the body 20 to the heater 365 in the cartomizer 30 via supply lines 366 and 367 as appropriate.

The cartomizer connector 370 is provided with two lugs or tabs 380A, 380B, which extend in opposite directions away from the longitudinal axis of the e-cigarette 10. These tabs are used to provide a bayonet fitting in conjunction with the body connector 240 for connecting the cartomizer 30 to the body 20. This bayonet fitting provides a secure and robust connection between the cartomizer 30 and the body 20, so that the cartomizer and body are held in a fixed position relative to one another, with minimal wobble or flexing, and the likelihood of any accidental disconnection is very small. At the same time, the bayonet fitting provides simple and rapid connection and disconnection by an insertion followed by a rotation for connection, and a rotation (in the reverse direction) followed by withdrawal for disconnection. It will be appreciated that other embodiments may use a different form of connection between the body 20 and the cartomizer 30, such as a snap fit or a screw connection.

It is noted that, in the embodiment of FIG. 2, the external housing 201 of the body 20 generally has the form of a cylindrical tube. This external housing 201 may comprise, for example, an inner tube of metal with an outer covering of paper or similar. However, it will be appreciated that the external shape/profile of the external housing 201 is not a critical function of the disclosure and thus the external housing 201 may take any form, such as cylindrical, polygonal, etc.

Figure 4:
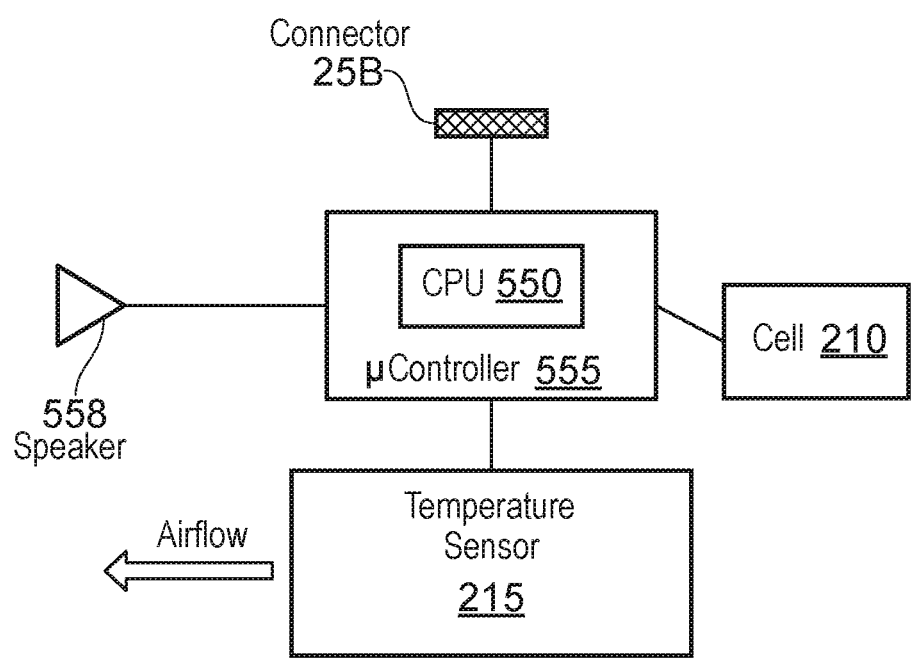
FIG. 4 is a schematic diagram of the main functional components of the body of the e-cigarette of FIG. 1.

FIG. 4 is a schematic diagram of the main functional components of the body 20 of the e-cigarette 10 of FIG. 1 in accordance with some embodiments of the disclosure. These components may be mounted on a circuit board (not shown) provided within the body 20, although depending on the particular configuration, in some embodiments, one or more of the components may instead be accommodated in the body 20 to operate in conjunction with the circuit board, but is/are not physically mounted on the circuit board itself.

The body 20 includes the heatable temperature sensor 215 located in or adjacent to the air path through the body 20 from the air inlet to the air outlet (to the vaporizer). The body 20 further includes an output device 558 (such as an optic, audio or haptic feedback device) and an electrical socket or connector 25B for connecting to the cartomizer 30 or to a USB charging device.

The microcontroller (e.g. an ASIC) 555 controls the operation of each of the other electrical/electronic components of the e-cigarette 10 and includes a CPU 550. The operations of the CPU 550 and the other electrical/electronic components are generally controlled at least in part by software programs running on the CPU (or other component). Such software programs may be stored in non-volatile memory, such as ROM, which can be integrated into the microcontroller 555 itself, or provided as a separate component. The CPU may access the ROM to load and execute individual software programs as and when required. The microcontroller 555 also contains appropriate communications interfaces (and control software) for communicating as appropriate with the other electrical/electronic components.

The CPU controls the output device 558 to produce various outputs to reflect conditions or states within the e-cigarette, such as a low battery warning. Different signals for signaling different states or conditions may be provided by utilizing lights, vibrations, tones or beeps of different pitch and/or duration, and/or by providing multiple such lights, vibrations, beeps or tones.

As previously mentioned, it is desirable to provide an e-cigarette with a vaporizer activation mechanism which is cheaper to manufacture and which nonetheless works in a reliable manner. With this in mind, the present technique provides an electronic vapor provision system (such as an e-cigarette 10) comprising a vaporizer (such as heater 365) for vaporizing aerosol precursor material (such as nicotine liquid) for inhalation by a user of the electronic vapor provision system, a power supply (for example, comprising a cell or battery such as cell 210) for supplying power to the vaporizer, a wall defining an air flow path along which air travels through the electronic vapor provision system when a user inhales or exhales on the electronic vapor provision system, a temperature sensor (such as temperature sensor 215) mounted in the air flow path adjacent a portion of the wall of the air flow path and a controller (such as microcontroller 555). The controller is configured to cause power to be supplied to the temperature sensor to heat the temperature sensor and to cause power to be supplied to the vaporizer to vaporize the aerosol precursor material in response to detecting a change in temperature of the temperature sensor. In one example, power is supplied to the vaporizer when the detected change in temperature or rate of detected change in temperature exceeds a predetermined minimum threshold. The air flow path is arranged such that, during inhalation or exhalation by the user, air travelling along the air flow path is directed at the temperature sensor in a direction that is towards the portion of the wall adjacent to which the temperature sensor is mounted so as to disrupt the airflow around the temperature sensor. Because the air travelling along the air flow path is directed at the temperature sensor in a direction that is towards the portion of the wall adjacent to which the temperature sensor is mounted, the air flow is disrupted around the temperature sensor (thus allowing more air molecules to impinge on the surface of the temperature sensor), thus making the temperature sensor more responsive to changes in its temperature caused by the air flow.

Thus, according to one embodiment of the present technique, in order to activate the vaporizer, a temperature sensor is mounted in an air flow path along which air is drawn when a user inhales on the electronic vapor provision system. The temperature sensor is heated to above ambient temperature so that when air is drawn though the electronic vapor provision system during inhalation (the air entering the electronic vapor provision device at ambient temperature), heat is carried away from the temperature sensor. This causes the temperature of the temperature sensor to reduce relative to its heated value. The vaporizer is then activated in response to a detection of this reduction in temperature. Heatable temperature sensors such as heatable thermistors are available at a low cost, thus reducing the manufacturing cost of the e-cigarette. Furthermore, because the temperature sensor is mounted in the air flow path adjacent a portion of the wall defining the air flow path and the air flow path is arranged such that, during inhalation by the user, air drawn through the air flow path is directed at the temperature sensor in a direction that is towards the portion of the wall adjacent to which the temperature sensor is mounted so as to disrupt air flow around the temperature sensor, improved sensitivity of the temperature sensor in detecting temperature changes is ensured. This allows activation of the vaporizer to function reliably in response to a user inhaling on the electronic vapor provision system.

Figure 5:
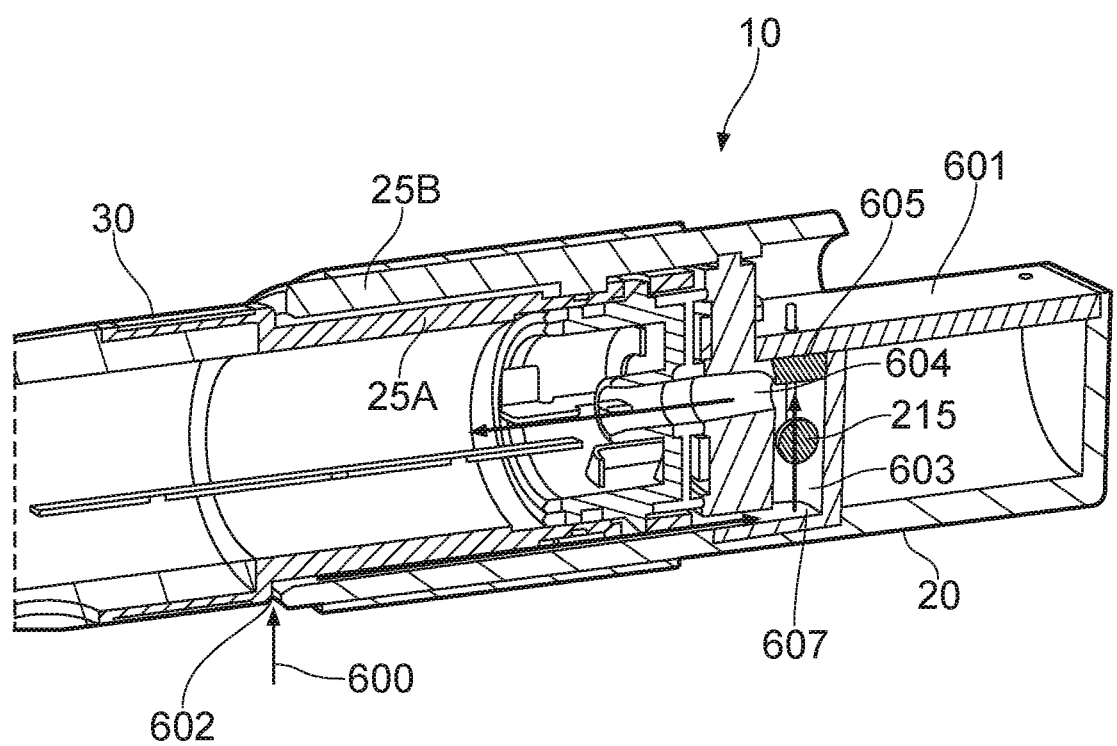
FIG. 5 is a schematic diagram showing the position of a heatable temperature sensor along a flow path of air in the e-cigarette of FIG. 1.

A demonstration of the principle behind the present technique is described in more detail with reference to FIG. 5, which schematically shows the position of a heatable temperature sensor 215 along a flow path of air in the e-cigarette 10, the flow path being indicated by the arrows 600. When a user inhales on the mouthpiece 35, air enters the e-cigarette at an inlet 602 of the cartomizer 30 of the e-cigarette and flows in the direction of the arrows 600 into the body 20 of the e-cigarette, reaching channel 603. The heatable temperature sensor 215 is positioned within channel 603. In this case, the temperature sensor 215 is a heatable thermistor, and as the air flows through the channel 603 and out of channel 604 towards the heater 365 and mouthpiece 35, the heated temperature of the thermistor is reduced. This temperature reduction causes a change in an electrical parameter of the thermistor which is detectable by the microcontroller 555, and thus, in response to this detected change (indicative of the temperature reduction), the microcontroller 555 causes power to be supplied to the heater 365. In the example of FIG. 5, the thermistor 215 is attached to a printed circuit board (PCB) 601 comprising the microcontroller 555. The PCB 601 comprises a sealing portion 605 (made of a resilient material such as silicone, for example) and is positioned such that the sealing portion 605 seals an end of the channel 603 and so that the inhaled air is directed though the channel 604 towards the heater 365 and mouthpiece 365.

Figure 6A:
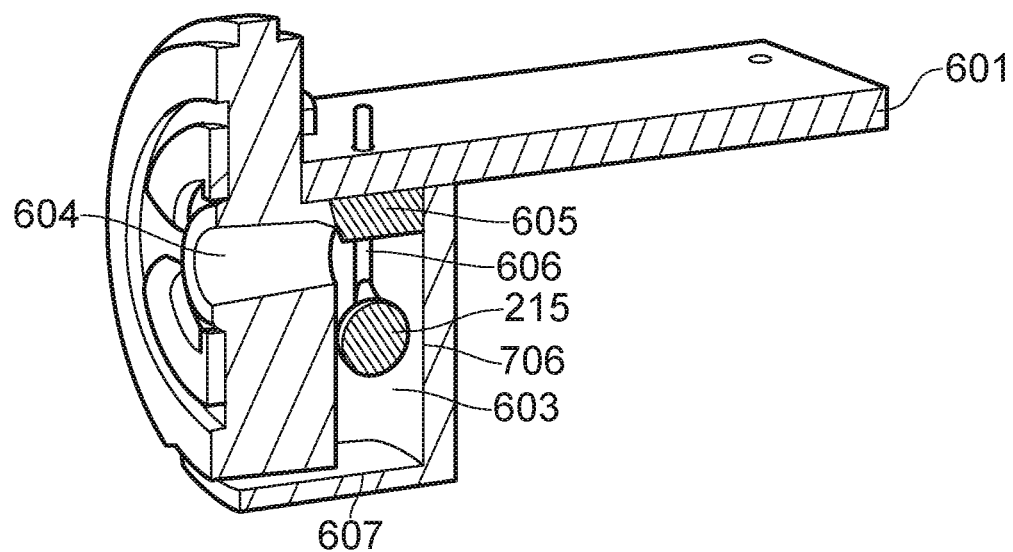
FIGS. 6A to 6C are schematic diagrams of various possible configurations of the heatable temperature sensor of FIG. 5.

FIG. 6A schematically shows an enlarged portion of FIG. 5 showing the thermistor 215, sealing portion 605, PCB 601 and channels 603 and 604. In this embodiment, these components are comprised within the body 20 of the e-cigarette. It can be seen that by positioning the thermistor 215 in the channel 603 in the way as shown (the thermistor 215 being positioned in the channel 603 by way of a connecting element 606 attached to and extending from the PCB 601 so that the thermistor 215 does not contact the inner wall 706 of the channel 603), the surface area of thermistor 215 in contact with air which flows through the channel 603 is increased.

Figure 6B:
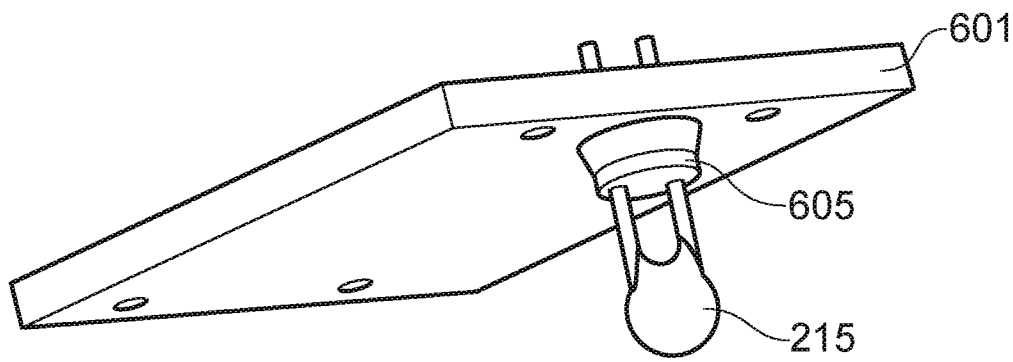

FIG. 6B shows the PCB 601 comprising the thermistor 215 and sealing portion 605. During manufacture of the e-cigarette, the PCB 601, thermistor 215 and sealing portion 605 can be combined together in advance and inserted into the body 20 of the e-cigarette. This is a low complexity (and therefore low cost) process.

Figure 6C:
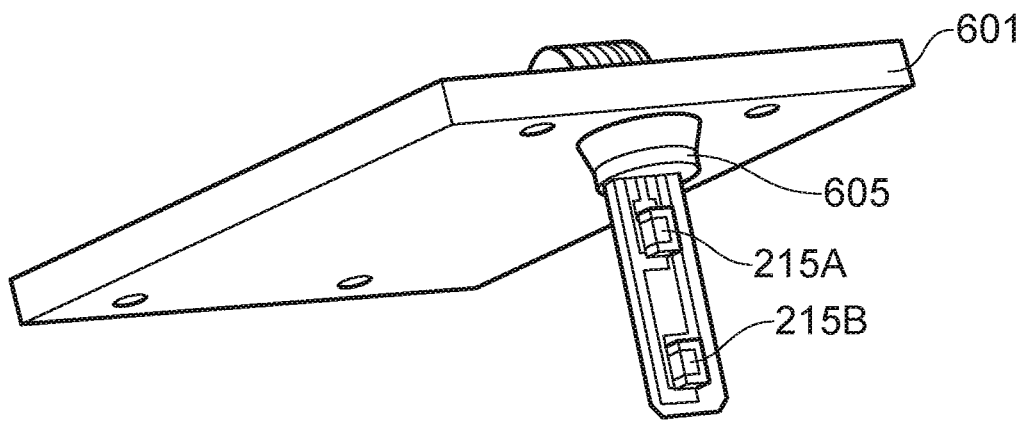

In this case, the thermistor 215 is a glass bead style thermistor. However, it will be appreciated that another type of thermistor could be used, such as a surface-mount thermistor. Such an arrangement is illustrated in FIG. 6C, in which two surface-mount thermistors 215A and 215B are provided on the PCB 601 (all other components previously described remain the same). In this case, the heatable temperature sensor as used with the present technique is a first one of the surface-mount thermistors (for example, 215A, which will be heated under control of the microcontroller 555) whereas a second one of the surface-mount thermistors (for example, 215B) will be for use in measuring the ambient temperature (and will therefore not be heated under control of the microcontroller 555). The purpose of measuring the ambient temperature is described later on. It will be appreciated that, in another embodiment, only one surface-mount thermistor may be used, this being the heatable temperature sensor as described. It is noted that the use of surface-mount thermistor(s) allows for quick temperature response and for a plurality of them (as in FIG. 6C) to be conveniently placed in the air stream. Furthermore, the cost of surface-mount thermistors is low.

It will be appreciated that a heatable temperature sensor other than a heatable thermistor may be utilized in order for the present technique to be carried out as described (for example, as implemented via the arrangement of FIG. 5). In particular, as long as (a) the microcontroller 555 is able to cause power to be supplied to the heatable temperature sensor so as to heat it to a temperature above ambient temperature and (b) the heatable temperature sensor is sufficiently sensitive for a change in temperature relative to its heated temperature to be detected when a user inhales on the e-cigarette 10, then the heatable temperature sensor may be used with the present technique. Such an alternative heatable temperature sensor could comprise a non-heatable temperature sensor with an electric heater mounted to and in thermal contact the non-heatable temperature sensor (thus forming, overall, a heatable temperature sensor). A heatable thermistor will, however, often be a suitable choice for implementing the present technique.

Thermistors are known to have a large resistance change with temperature. Thus, when a heatable thermistor is used with the present technique as the heatable temperature sensor 215, even a small reduction in the heated temperature of the thermistor due to inhaled air flow is detectable due to the change in resistance (or the change in another electrical parameter associated with the resistance, such as the thermistor current, a computed thermistor temperature or the additional power supplied to the thermistor in order to compensate for the cooling and for the temperature of the thermistor to return to its original heated temperature). It is noted that the more power supplied to heat the heatable thermistor, the larger a given signal output in response to cooling of the heatable thermistor by the inhaled air flow will be (thus making the thermistor more sensitive to temperature changes). However, supplying more power to heat the heatable thermistor will also reduce the life of the battery/cell 210. The power supplied to the heatable thermistor thus needs to be suitably determined, taking into account these constraints.

The temperature of a heated thermistor is approximated by the equation:

$$T_H = T_0 + \frac{V^2}{KR}$$

wherein $T_H$ is the heated temperature of the thermistor, $T_0$ is the ambient temperature (measured as described below), K is the dissipation constant, V is the voltage applied across the thermistor and R is the thermistor resistance (V and R being measurable as electrical parameters of the thermistor 215 by the microcontroller 555, for example). It will be appreciated that, during the flow of air over the thermistor during inhalation, the thermistor will be cooled, thus causing $T_H$ to be reduced. This reduction in temperature can be detected by the microcontroller 555 by detecting the corresponding change (increase) in R (since $T_0$, K and V will all remain fixed) or another parameter (such as the thermistor current $$I = \frac{V}{R})$$

associated with R (and therefore associated with $T_H$). Alternatively, the microcontroller may increase V (thus increasing the power supplied to the thermistor 215) in order to compensate for the cooling effect and to try to maintain $T_H$ as constant.

In general, it will be appreciated that the microcontroller 555 may control the amount of power supplied to the heater 365 based on one of an amount of a detected change in a parameter (such as R, I, V or even $T_H$ itself) related to the heated temperature of the thermistor 215 and a rate of the detected change in the parameter related to the heated temperature of the first heatable temperature sensor. In a first example, the microcontroller 555 only causes power to be supplied to the heater 365 when one of an amount of the detected change in the parameter related to the heated temperature of the thermistor 215 or a rate of the detected change in the parameter related to the heated temperature of the thermistor 215 exceeds a predetermined minimum threshold. This ensures that small, accidental changes in the heated temperature of the thermistor 215 that do not result from a user inhalation do not cause power to be supplied to the heater 365, thus conserving battery life and providing improved user safety. In a second example (which may be carried out in addition to the first example, i.e. only after the change or rate of change in the parameter related to the thermistor heated temperature exceeds the predetermined threshold), the microcontroller may cause the amount of power to be supplied to the heater 365 to be adjusted in a real time manner depending on the detected change or rate of change of the parameter related to the thermistor heated temperature at a given time. This allows the amount of liquid (or other aerosol precursor material) vaporization to be controlled so that, for example, a large/rapid change in temperature resulting from a stronger inhalation by the user results in more power being supplied to the heater 365 (and thus more vaporization of liquid) compared to a smaller/less rapid change in temperature resulting from a weaker inhalation by the user (which requires less vaporization of liquid). It will be appreciated that any suitable relationship between the detected change/or rate of change of the parameter related to the thermistor heated temperature and the amount of power supplied to the heater 365 could be used with the present technique by suitable configuration of the microcontroller 555, depending on the desired characteristics of the e-cigarette.

In another example, the microcontroller 555 may be configured with an air flow model which relates a volume of air which flows through the e-cigarette (and thus an appropriate amount of power to be supplied to the heater 365, with more power being supplied for larger volumes and less power being supplied for smaller volumes) with a detected change in the heated temperature $T_H$ of the thermistor. The amount of power supplied to the heater 365 for a given volume of air may be recalibrated depending on $T_0$, since the air density changes as $T_0$ changes ($T_0$ is equal to the temperature of the air which enters the channel 603 within which the thermistor 215 is located). For example, for a lower $T_0$, the air density is higher and thus it may be appropriate to reduce the amount of power supplied to the heater 365 (since the denser air flow will result in a higher level of aerosol transport for a given heater power input), and for a higher $T_0$, the air density is lower and thus it may be appropriate to increase the amount of power supplied to the heater 365 (since the thinner air flow will result in a lower level of aerosol transport for a given heater power input). It will be appreciated that $T_0$ will vary depending on the temperature of the environment in which the e-cigarette is located, and therefore needs to be measured in order for this recalibration to take place. It will also be appreciated that (a) the relationship between the change in temperature $T_H$ and the inhalation air flow volume defining the air flow model and/or (b) the relationship between the amount of power supplied to the heater 365 and the air inhalation air flow volume at a given ambient temperature $T_0$ may take many different potential forms, depending on the desired characteristics of the e-cigarette 10.

It will be appreciated that, if a further heatable temperature sensor is used (such as further temperature sensor 800 described with reference to FIGS. 8A and 8B, for example), then the microcontroller 555 may control the amount of power supplied to the heater 365 based on one of an amount of a detected change in a parameter (such as R, I, V or even $T_H$ itself, when the further temperature sensor is a thermistor) related to the heated temperature of the further temperature sensor and a rate of the detected change in the parameter related to the heated temperature of the further temperature sensor (instead of or in addition to controlling the amount of power supplied to the heater 365 based on one of an amount of a detected change in a parameter related to the heated temperature of the temperature sensor 215 and a rate of the detected change in the parameter related to the heated temperature of the temperature sensor 215). The above-described examples may be applied to the further temperature sensor in this case. In particular, one of more of the above-described examples of (a) only causing power to be supplied to the heater 365 when one of an amount of the detected change in the parameter related to the heated temperature of the further temperature sensor or a rate of the detected change in the parameter related to the heated temperature of the further temperature sensor exceeds a predetermined threshold, (b) causing the amount of power to be supplied to the heater 365 to be adjusted in a real time manner depending on the detected change or rate of change of the parameter related to the further temperature sensor at a given time, and (c) controlling the amount of power to be supplied to the heater 365 based on an air flow model may be applied to the further temperature sensor. Thus, even though a first temperature sensor and a second temperature sensor may be placed at different positions along an air flow path of the e-cigarette 10 (see again, for example, the thermistor 215, which is an example of a first temperature sensor, and the thermistor 800, which is an example of a second temperature sensor, in FIGS. 8A and 8B) so as to allow a distinction to be made between inhale and exhale air flow, the air flow may be monitored using one or both of these sensors in determining whether or not to supply power to the heater 365 and/or how much power should be supplied to the heater 365.

In one example, the microcontroller 555 detects the ambient temperature using the thermistor 215 prior to causing power to be supplied to the thermistor to heat the thermistor. It is also envisaged that if a further heatable temperature sensor is used (such as further temperature sensor 800 described with reference to FIGS. 8A and 8B, for example), then the microcontroller 555 may detect the ambient temperature $T_0$ using this second heatable sensor prior to causing power to be supplied to this second heatable sensor. Either arrangement avoids the need for any additional thermistors or other temperature sensors to be included in the e-cigarette 10 in order for the ambient temperature $T_0$ to be measured, thus reducing the complexity (and therefore the cost) of manufacturing the e-cigarette. In another example, however, the e-cigarette 10 comprises an additional, unheated ambient temperature sensor (such as second thermistor 215B) via which the microcontroller 555 is configured to continually measure the ambient temperature. This allows the amount of power supplied to the heater 365 for a given air flow volume to be continually recalibrated during use of the e-cigarette in response to changes in ambient temperature $T_0$, thus providing better controlled vaporization when the ambient temperature $T_0$ changes regularly.

As previously mentioned, in an embodiment of the present technique, the temperature sensor 215 is mounted in the air flow path adjacent a portion of a wall defining the air flow path. The air flow path is arranged such that, during inhalation by the user, air drawn through the air flow path is directed at the temperature sensor in a direction that is towards the portion of the wall adjacent to which the temperature sensor is mounted so as to disrupt the airflow around the temperature sensor. This improves the sensitivity of the temperature sensor in detecting changes in its heated temperature due to air flow caused by a user inhaling on the electronic vapor provision system. Such an arrangement is shown in FIG. 7A.

Figure 7A:
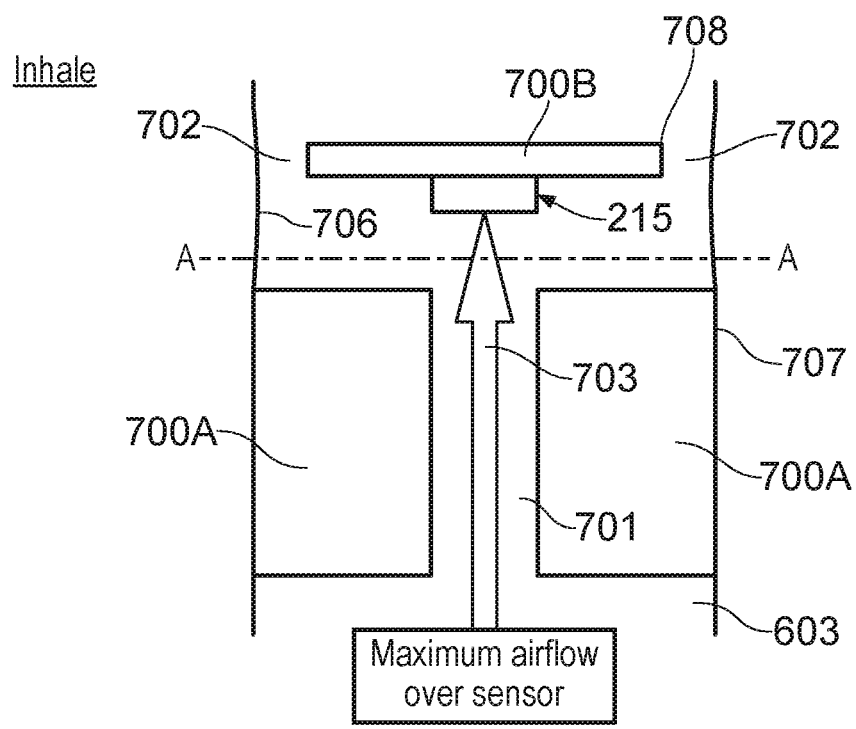
FIGS. 7A and 7B are schematic diagrams of an example air flow path geometry when a single heatable temperature sensor is used in the e-cigarette of FIG. 1.

FIG. 7A shows a cross-section of the channel 603 within which the heatable temperature sensor 215 is located, according to an embodiment. In this example, as well as the heatable temperature sensor 215, the channel 603 also comprises barrier portions 700A and 700B which block a portion of the cross-section (in a plane parallel to the line A-A) of the air channel 603 through which air travels. The outer surfaces of each of the barrier portions 700A and 700B within the channel 306, together with the portions of the inner wall 706 of the channel 306 not covered by the barrier portion 700A, form a wall defining an air flow path through which air travels during inhalation and exhalation. In FIG. 7A, the channel 603 is a cylindrical tube. A first barrier portion 700A is also cylindrical and is sized so as to fit inside the inner wall 706 of the channel 603 so that air cannot flow between the inner wall 706 of the channel 603 and the outer wall 707 of the first barrier portion. The first barrier portion 700A may be fixed within the channel 603 via a friction fit or via an adhesive, for example. The first barrier portion 700A comprises a central bore 701. Air flowing through the channel 603 must therefore flow through this central bore 701. The second barrier portion 700B is a circular disc positioned at a certain distance from the first barrier portion 700A at a side of the first barrier portion 700A at which air exits the central bore 701 during inhalation air flow. The second barrier portion 700B is positioned so as to be parallel with the plane parallel to the line A-A and so that it completely overlaps the central bore 701 when viewed through the cross-section parallel to the line A-A. The second barrier portion 700B has a radius less than that of the cross-section of the channel 603 parallel to the line A-A so that an annular gap 702 is formed between the circular edge 708 of the second barrier portion 700B and the inner wall 706 of the channel 603. Air which flows through the channel 603 must therefore flow through the gap 702. The heatable temperature sensor 215 is fixed (via an adhesive or the like) on the side of the second barrier portion 700B facing the exit of the central bore 701 and in line with the exit of the central bore 701. Air exiting the central bore 701 during inhalation (as shown by arrow 703 in FIG. 7A) is therefore directed at the heatable temperature sensor 215. In other words, the air is directed at the temperature sensor 215 in a direction that is towards a portion of the wall defining the air flow path through the channel 306 adjacent to which the temperature sensor 215 is mounted so as to disrupt the air flow around the temperature sensor 215 (the portion of the wall adjacent to which the temperature sensor 215 is mounted being the portion of the second barrier portion 700B on which the temperature sensor is fixed, in this case). The inhaled air then travels through the gap 702 and into the channel 604 (not shown in FIG. 7A) towards the heater 365 and mouthpiece 35.

Figure 7B:
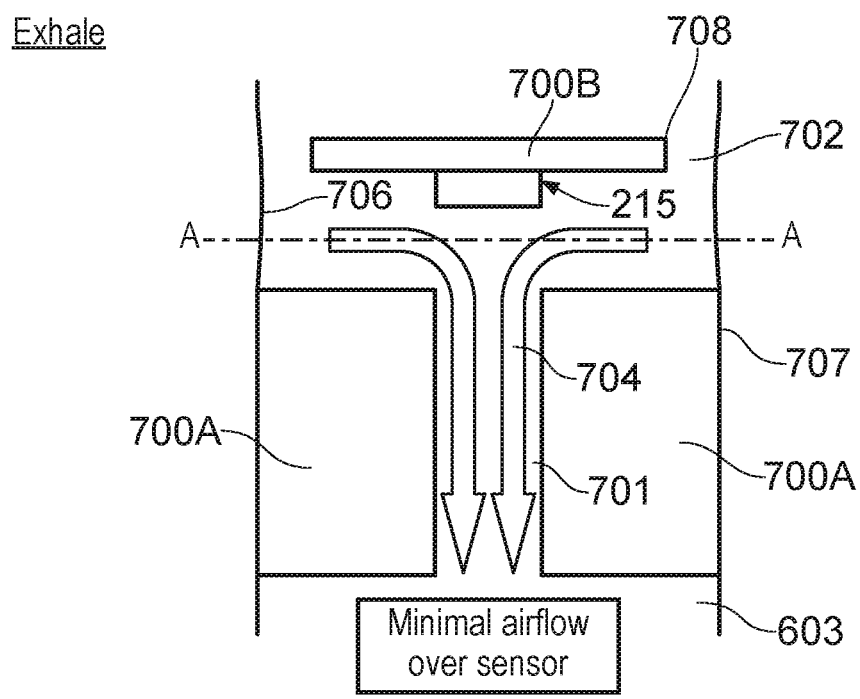

In addition, the air flow path arrangement shown in FIG. 7A is such that, when the user exhales on the electronic vapor provision system, air travels through the air flow path and is not directed at the temperature sensor in a direction that is towards the portion of the wall adjacent to which the temperature sensor is mounted so as to disrupt the airflow around the temperature sensor. Such an arrangement is shown in FIG. 7B, which is exactly the same as FIG. 7A except that it shows airflow during exhale rather than inhale. Here, it can be seen that air entering the central bore 701 during exhalation (as shown by arrows 704 in FIG. 7B) is not directed at the heatable temperature sensor 215. The exhaled air then travels through the central bore 701 towards the inlet 602 where it leaves the e-cigarette 10.

In the arrangements shown in FIGS. 7A and 7B, the second barrier portion 700B may be fixed in the channel 603 by way of a connecting element attached to and extending from the PCB 601 (not shown in FIG. 7A or 7B) similar to the connecting element 606 shown in FIG. 6A, for example. Because air is not directed at the temperature sensor 215 during exhale (unlike during inhale), the amount of heat carried away from the temperature sensor 215 during exhale is reduced compared to the amount of heat carried away from the temperature sensor 215 during inhale (since fewer molecules impinge on the surface of the temperature sensor). This results in a smaller/less rapid detectable decrease in the heated temperature of the temperature sensor 215 during exhale compared to inhale. Inhalation (when the heater 365 should be activated) and exhalation (when the heater 365 should not be activated) is therefore distinguishable due to this difference in the change in heated temperature. The microcontroller 555 thus causes power to be supplied to the heater 365 only when one of an amount of the detected change in a parameter (such as R, I, V or even the heated temperature $T_H$ itself, when the heatable temperature sensor 215 is a heatable thermistor) related to the heated temperature of the heatable temperature sensor or a rate of the detected change in the parameter related to the heated temperature of the first heatable temperature sensor exceeds a predetermined threshold, the predetermined threshold being chosen such that power is supplied to the heater 365 only during inhalation (not exhalation). The prevention of power being supplied to the heater 365 during exhalation (when liquid does not need to be vaporized and when the heater 365 therefore does not need to be activated) reduces power consumption of the e-cigarette 10 and helps prevent unintended activation of the heater 365 (thus improving user safety).

In an alternative embodiment, the arrangements of FIGS. 7A and 7B are reversed for inhale and exhale. In such an embodiment, FIG. 7A will relate to exhale (so that the airflow indicated by arrow 703 relates to exhale rather than inhale) and FIG. 7B will relate to inhale (so that the airflow indicated by the arrows 704 relates to inhale rather than exhale). Such an arrangement may be implemented by reversing the positions of the first and second barrier portions 700A and 700B in the channel 603 (so that the arrangement of the first and second barrier portions 700A and 700B appear upside down in the channel 603 compared to the arrangement shown in FIGS. 7A and 7B). In this case, the second barrier portion 700B may be fixed in the channel 603 by way of a connecting element attached to and extending from a floor portion 607 of the channel 603. In this case, air exits the central bore 701 during exhalation (rather than inhalation) and is directed at the heatable temperature sensor 215. In other words, the air is directed at the temperature sensor 215 in a direction that is towards a portion of the wall defining the air flow path through the channel 306 adjacent to which the temperature sensor 215 is mounted so as to disrupt the air flow around the temperature sensor 215 (the portion of the wall adjacent to which the temperature sensor 215 is mounted again being the portion of the second barrier portion 700B on which the temperature sensor is fixed, in this case). The exhaled air then travels through the gap 702 and towards the inlet 602 where it leaves the e-cigarette 10. In addition, when the user inhales on the electronic vapor provision system, air travels through the air flow path and is not directed at the temperature sensor in a direction that is towards the portion of the wall adjacent to which the temperature sensor is mounted so as to disrupt the airflow around the temperature sensor. In this case, air enters the central bore 701 during inhalation and is not directed at the heatable temperature sensor 215. The inhaled air then travels through the central bore 701 and into the channel 604 (not shown in FIG. 7A) towards the heater 365 and mouthpiece 35.

In this alternative embodiment, because air is not directed at the temperature sensor 215 during inhale (unlike during exhale), the amount of heat carried away from the temperature sensor 215 during inhale is reduced compared to the amount of heat carried away from the temperature sensor 215 during exhale. This results in a smaller/less rapid detectable decrease in the heated temperature of the temperature sensor 215 during inhale compared to exhale. Inhalation (when the heater 365 should be activated) and exhalation (when the heater 365 should not be activated) is therefore distinguishable due to this difference in the change in heated temperature. The microcontroller 555 thus causes power to be supplied to the heater 365 only when one of an amount of the detected change in a parameter (such as R, I, V or even the heated temperature $T_H$ itself, when the heatable temperature sensor 215 is a heatable thermistor) related to the heated temperature of the heatable temperature sensor or a rate of the detected change in the parameter related to the heated temperature of the first heatable temperature sensor is below a predetermined threshold, the predetermined threshold being chosen such that power is supplied to the heater 365 only during inhalation (not exhalation). The prevention of power being supplied to the heater 365 during exhalation (when liquid does not need to be vaporized and when the heater 365 therefore does not need to be activated) reduces power consumption of the e-cigarette 10 and helps prevent unintended activation of the heater 365 (thus improving user safety). This method can also be combined with other methods of flow control such as use of a reed valve (or the like). Use of such other methods helps prevent air flow in the exhale direction, thus further alleviating ambiguity between inhale and exhale airflow.

Figure 8A:
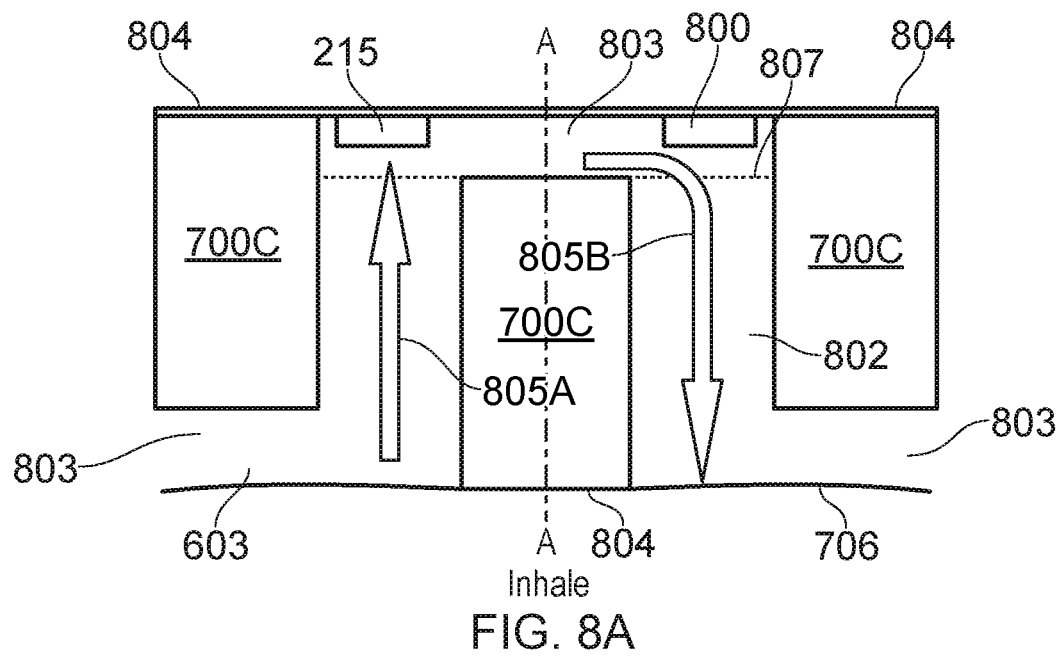
FIGS. 8A and 8B are schematic diagrams of an example air flow path geometry when two heatable temperature sensors are used in the e-cigarette of FIG. 1.
Figure 8B:
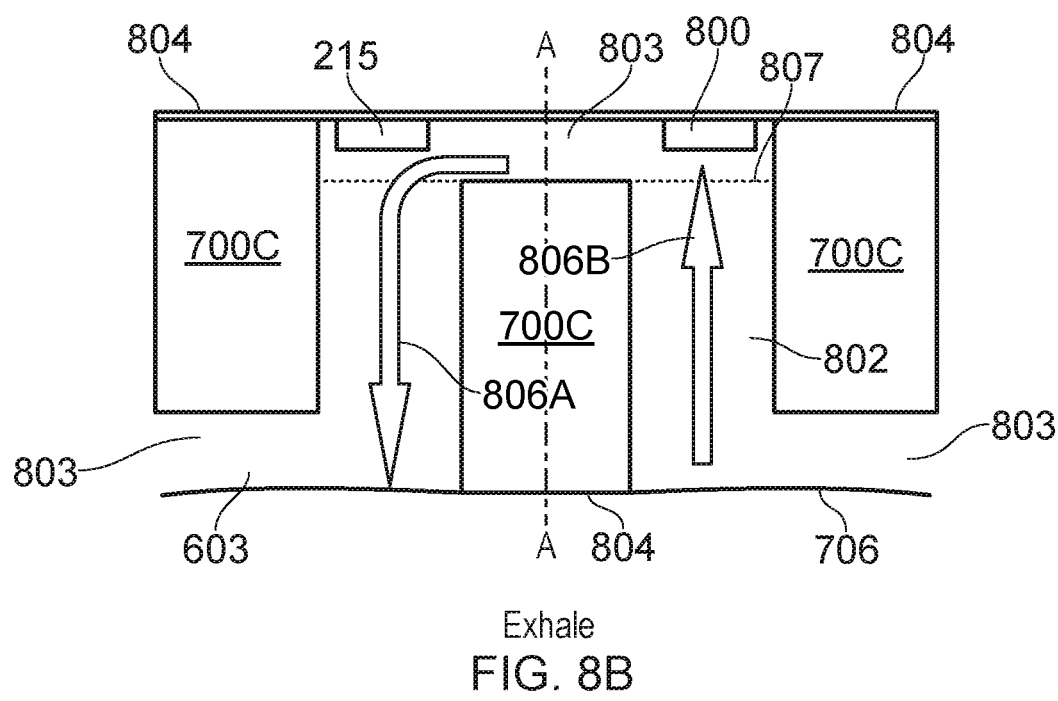

In another embodiment, the e-cigarette 10 may also be provided with a further heatable temperature sensor 800 (see FIGS. 8A and 8B). In this case, the further temperature sensor 800 is mounted in the air flow path adjacent a further portion of the wall of the air flow path. The airflow path is arranged such that, when the user inhales on the e-cigarette 10, air travels through the air flow path and is directed at a first one of the temperature sensors 215 and 800 in a direction that is towards the portion of the wall adjacent to which that first temperature sensor 215 or 800 is mounted so as to disrupt the airflow around that first temperature sensor. The air is also not directed at a second, different, one of the temperature sensors 215 and 800 in a direction that is towards the portion of the wall adjacent to which that second temperature sensor 215 or 800 is mounted so as to disrupt the airflow around that second temperature sensor. The airflow path is further arranged such that, when the user exhales on the e-cigarette 10, air travels through the air flow path and is directed at the second one of the temperature sensors 215 and 800 in a direction that is towards the portion of the wall adjacent to which that second temperature sensor 215 or 800 is mounted so as to disrupt the airflow around that second temperature sensor. The air is also not directed at the first one of the temperature sensors 215 and 800 in a direction that is towards the portion of the wall adjacent to which that first temperature sensor 215 or 800 is mounted so as to disrupt the airflow around that first temperature sensor. The second heatable temperature sensor 800 may, for example, have the same electrical characteristics and be implemented in the e-cigarette 10 in the same way as previously described for the first heatable temperature sensor 215. In particular, the microcontroller 555 may cause power to be supplied to heat the second heatable temperature sensor 800 and the second heatable temperature sensor 800 may be, for example, a heatable thermistor with one or more electrical parameters (such as R, I or V) detectable by the microcontroller 555 (as previously described).

Such an embodiment is exemplified with reference to FIGS. 8A and 8B. During inhalation (as shown in FIG. 8A), air is directed at the temperature sensor 215 but not at the temperature sensor 800 (so that more air molecules impinge on the surface of temperature sensor 215 than on the surface of temperature sensor 800 during inhalation). The amount of heat carried away from the temperature sensor 215 is therefore larger than the amount of heat carried away from the temperature sensor 800, thus causing a larger/more rapid detectable decrease in the heated temperature of the temperature sensor 215 than that of the temperature sensor 800. On the other hand, during exhalation (as shown in FIG. 8B), air is directed at the temperature sensor 800 but not at the temperature sensor 215 (so that more air molecules impinge on the surface of temperature sensor 800 than on the surface of temperature sensor 125 during inhalation). The amount of heat carried away from the temperature sensor 800 is therefore larger than the amount of heat carried away from the temperature sensor 215, thus causing a larger/more rapid detectable decrease in the heated temperature of the temperature sensor 800 than that of the temperature sensor 215. Inhalation (when the heater 365 should be activated) and exhalation (when the heater 365 should not be activated) is therefore distinguishable due to the relative difference in the change in heated temperature of the temperature sensors 215 and 800. The microcontroller 555 thus causes power to be supplied to the heater 365 only when one of an amount of the detected change in a parameter (such as R, I, V or even the heated temperature $T_H$ itself, when the heatable temperature sensors 215 and 800 are heatable thermistors) related to the heated temperature of the temperature sensor 215 exceeds an amount of the detected change in that parameter for the temperature sensor 800 or a rate of the detected change in the parameter related to the heated temperature of the temperature sensor 215 exceeds a rate of the detected change in that parameter for the temperature sensor 800. This ensures that power is only supplied to the heater 365 during inhalation (not exhalation). Again, the prevention of power being supplied to the heater 365 during exhalation (when aerosol precursor material does not need to be vaporized and when the heater 365 therefore does not need to be activated) reduces power consumption of the e-cigarette 10 and helps prevent unintended activation of the heater 365 (thus improving user safety).

As previously mentioned, an example arrangement which allows inhalation and exhalation to be distinguished according to this embodiment is schematically shown in FIGS. 8A (showing inhalation) and 8B (showing exhalation). These figures show a cross-section of the channel 603 within which the temperature sensors 215 and 800 are located. In this example, as well as the heatable temperature sensors 215 and 800, the channel 603 also comprises a plurality of barrier portions 700C (three barrier portions are shown in this case) which each block a portion of the cross-section (in a plane parallel to the line A-A) of the air channel 603 through which air travels. The outer surfaces of each of the barrier portions 700C within the channel 306, together with the portions of the inner wall 706 of the channel 306 not covered by the barrier portions 700C, form a wall defining an air flow path through which air travels during inhalation and exhalation.

In FIGS. 8A and 8B, the channel 603 is a cylindrical tube. Each of the barrier portions 700C is also cylindrical and is sized so as to fit inside the inner wall 706 of the channel 603 so that, with the exception of a cut-away portion 803 of each barrier portion 700C, air cannot flow between the inner wall 706 of the channel 603 and the outer wall 804 of each barrier portion 700C. Each barrier portion 700C may be fixed within the channel 603 via a friction fit or via an adhesive, for example. During inhalation/exhalation, air must therefore flow through the cut-away portion 803 of each barrier portion 700C in order to flow through the channel 603. The relative positions of the cut-away portions 803 of the barrier portions 700C are such that a U-shaped sub-channel 802 along which air must flow is formed with the channel 603. Each of the temperature sensors 215 and 800 is fixed (via an adhesive or the like) onto the inner wall 706 of the channel 603 at opposite ends of the base of the U-shaped sub-channel 802 (the base of the U-shaped channel 802 being indicated by dotted lines 807 in FIGS. 8A and 8B). It will be appreciated that the temperature sensors 215 and 800 are thus mounted adjacent to respective portions of the wall defining the air flow path. During inhalation (FIG. 8A), air flows from the inlet 602 and into the U-shaped sub-channel 802, where it is directed towards the temperature sensor 215 along the direction of the arrow 805A, away from the heatable temperature sensor 800 in the direction of the arrow 805B and out towards the heater 365 and mouthpiece 35. The air is therefore directed towards temperature sensor 215 but not towards the temperature sensor 800 during inhalation. More specifically, the air is directed at the temperature sensor 215 in a direction that is towards the portion of the wall adjacent to which the temperature sensor 215 is mounted so as to disrupt the airflow around the temperature sensor 215 and is not directed at the temperature sensor 800 in a direction towards the portion of the wall adjacent to which the temperature sensor 800 is mounted so as to disrupt the airflow around the temperature sensor 800. On the other hand, during exhalation (FIG. 8B), air flows from the inlet mouthpiece 35 and into the U-shaped sub-channel 802, where it is directed towards the heatable temperature sensor 800 along the direction of the arrow 806B, away from the heatable temperature sensor 215 in the direction of the arrow 806A and out towards the inlet 602. The air is therefore directed towards temperature sensor 800 but not towards the temperature sensor 215 during exhalation. More specifically, the air is directed at the temperature sensor 800 in a direction that is towards the portion of the wall adjacent to which the temperature sensor 800 is mounted so as to disrupt the airflow around the temperature sensor 800 and is not directed at the temperature sensor 215 in a direction towards the portion of the wall adjacent to which the temperature sensor 215 is mounted so as to disrupt the airflow around the temperature sensor 215.

It is noted that when two heatable temperature sensors 215 and 800 are used rather than a single heatable temperature sensor 215 in the way as described, the ability to detect the direction of the air flow (inhale or exhale) based on the relative detected changes in temperature of each of the heated temperature sensors means that the amount of power supplied to each of the heatable temperature sensors may be reduced compared to the situation in which a single heatable temperature sensor is used. It is therefore possible to reduce power consumption of the e-cigarette 10 in this way.

It will be appreciated that the air flow paths shown in FIGS. 7A and 7B and FIGS. 8A and 8B are merely example air flow paths, and that other air flow path geometries which achieve similar effects could also be used. Such flow path geometries may use any suitable means for directing the air flow such as air concentrators, air deflectors, flaps, volume changes and so on.

In an embodiment, upon initially detecting a change in a parameter (such as R, I, V or even the heated temperature $T_H$ itself, when the heatable temperature sensor 215 is a heatable thermistor) related to the heated temperature of the heatable temperature sensor 215 and/or 800, the microcontroller 555 is configured to cause power to be supplied to the heater 365 until the one of the amount of the detected change in parameter related to the heated temperature of the heatable temperature sensor 215 and/or 800 or the rate of the detected change in the parameter related to the heated temperature of the heatable temperature sensor 215 and/or 800 has been determined. This initializes heating of the heater 365 before it has been established as to whether the detected heated temperature change of the heatable temperature sensor 215 and/or 800 should be carried out (this being determined according to the arrangements as previously described, for example). If it is determined that the heater 365 should have been activated (for example, if the reduction/rate of reduction in the heated temperature of the heatable temperature sensor 215 exceeds or is below a predetermined threshold or if the reduction/rate of reduction in the heated temperature of a first one of the temperature sensors 215 and 800 exceeds that of the of reduction in the heated temperature of a second, different, one of the temperature sensors 215 and 800), then the microcontroller 555 continues to cause power to be supplied to the heater 365. On the other hand, if it is determined that the heater 365 should not have been activated (for example, if the reduction/rate of reduction in the heated temperature of the heatable temperature sensor 215 does not exceed or is not below a predetermined threshold or if the reduction/rate of reduction in the heated temperature of a first one of the temperature sensors 215 and 800 does not exceed that of the reduction/rate of reduction in the heated temperature of a second, different, one of the temperature sensors 215 and 800), then the microcontroller 555 causes power to stop being supplied to the heater 365. Such an arrangement results in a quicker response time of the heater 365 during genuine inhalation, since the user does not have to wait for the microcontroller 555 to compute that the genuine inhalation has occurred. At the same time, false activation of the heater 365 (e.g. during exhalation) is quickly rectified, thereby reducing wasted battery power and the risk of the heater being unintentionally activated for a long period of time.

It is noted that, in an embodiment, when the e-cigarette 10 is first switched on, the microcontroller 555 immediately causes power to be supplied to the heatable temperature sensor 215 and/or 800 so as to heat it to its heated temperature. This ensures that the microcontroller 555 is ready to detect a user's first "puff" (inhalation) as soon as possible. Furthermore, in another embodiment, the microcontroller 555, upon causing power to stop being supplied to the heater 365 (as occurs, for example, when the microcontroller 555 detects that the temperature of the heatable temperature sensor 215 and/or 800 has returned to its heated value after a period of being cooled, thus implying the end of an inhalation), causes power to stop being supplied to the heatable temperature sensor 215 and/or 800 for a predetermined time period so as to reduce power consumption of the e-cigarette 10. The predetermined time period is determined based on the typical time period between a user's puffs on the e-cigarette 10. For example, the predetermined time period may be determined to be half this typical puff period (e.g. 15 seconds if the typical puff period is 30 seconds).

Figure 9A:
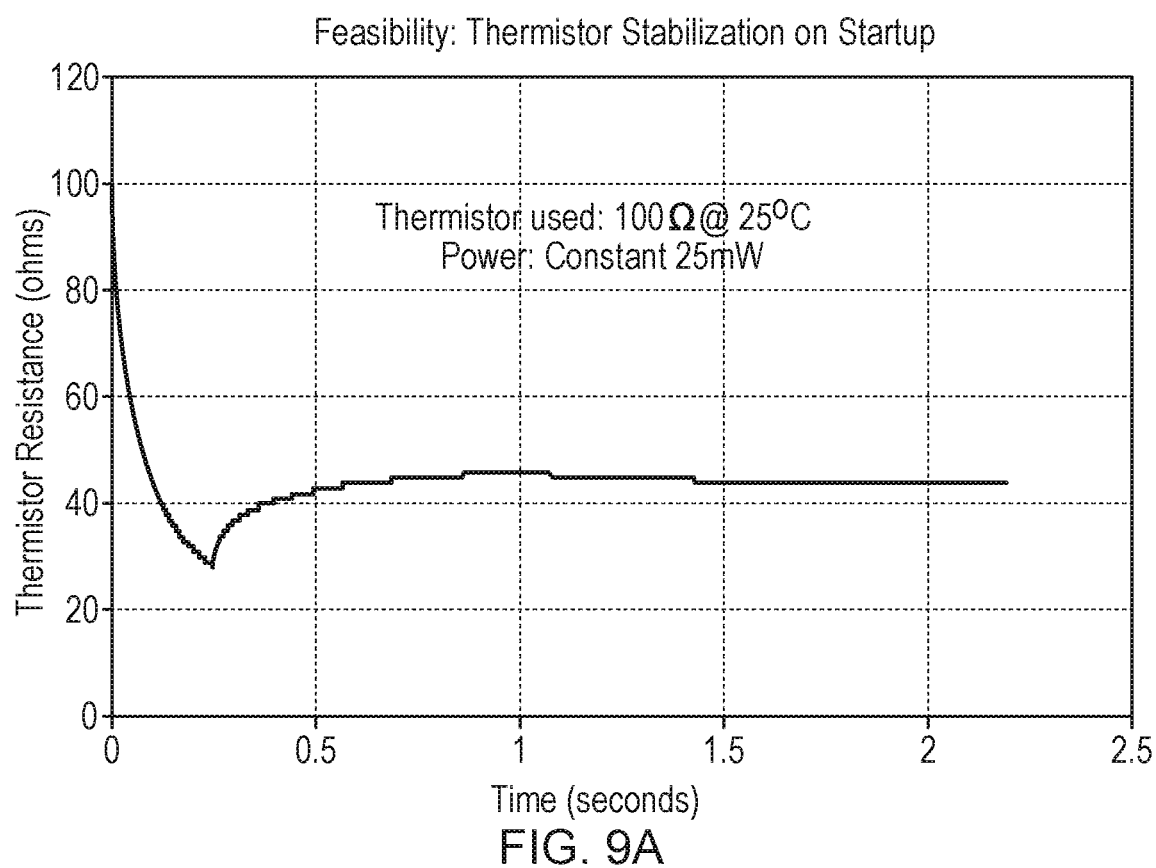
FIGS. 9A to 9C show results of an experimental demonstration of the present technique.
Figure 9B:
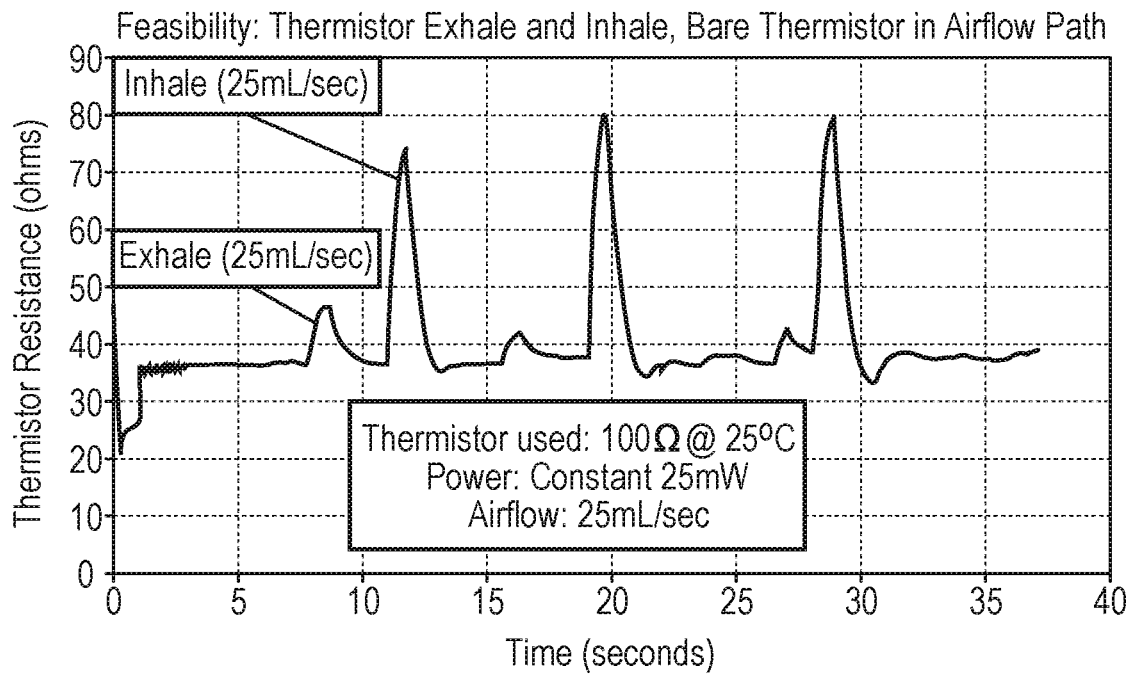
Figure 9C:
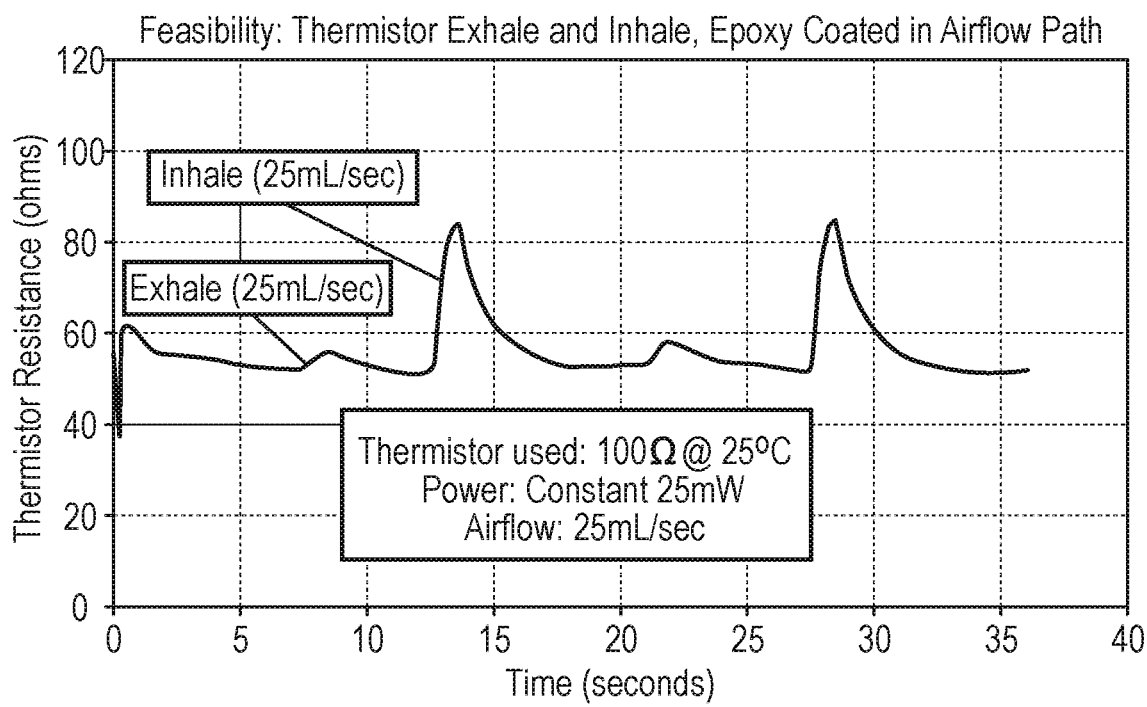

FIGS. 9A to 9C show results of an experimental demonstration of the present technique. In this case, a glass bead heatable thermistor was used as the heatable temperature sensor 215 and a flow geometry similar to that shown in FIGS. 7A and 7B was used. The thermistor was a 100 ohm at 25° C. and a combination of hardware and software (forming a microcontroller 555) was used to supply a constant power of 25 mW to the thermistor. Each of FIGS. 9A to 9C show a thermistor resistance (in ohms) against time (in seconds). It is noted that the software wasn't optimized for either start-up or running, meaning that the start-up/stabilisation time is slightly different in each of the graphs. However, these experimental results nonetheless suitably demonstrate the present technique. FIG. 9A shows the measured thermistor resistance during start-up/stabilization (that is, when power is initially supplied to the thermistor and when, after a certain period of time, the resistance of the thermistor stabilizes to an approximately constant value). In the example of FIG. 9A, it is noted that the power level was initially controlled to be 100 mW so as to enable the stabilization temperature to be quickly reached. The power level was then controlled to be 25 mW. FIG. 9B shows the measured thermistor resistance when a constant flow of air (25 mL/s) is passed over the thermistor during an inhale and exhale operation. It can be seen that, due to the air flow path geometry described above, the inhale and exhale operations are distinguishable by the change in resistance of the thermistor. FIG. 9C again shows the measured thermistor resistance when a constant flow of air (25 mL/s) is passed over the thermistor during an inhale and exhale operation. This time, however, the temperature-sensing surface of the thermistor is covered by a layer of epoxy resin. It can be seen that such an arrangement affects the changes in thermistor resistance associated with each of the inhale and exhale operations. In particular, the magnitude of the changes is reduced, particularly for the exhale operations (which are now associated with a much smaller change in resistance). It will be appreciated that various characteristics of the thermistor (such as coatings on the temperature-sensing surface or the like) may be adjusted, as appropriate, in order to improve the effectiveness of the present technique.

Figure 10:
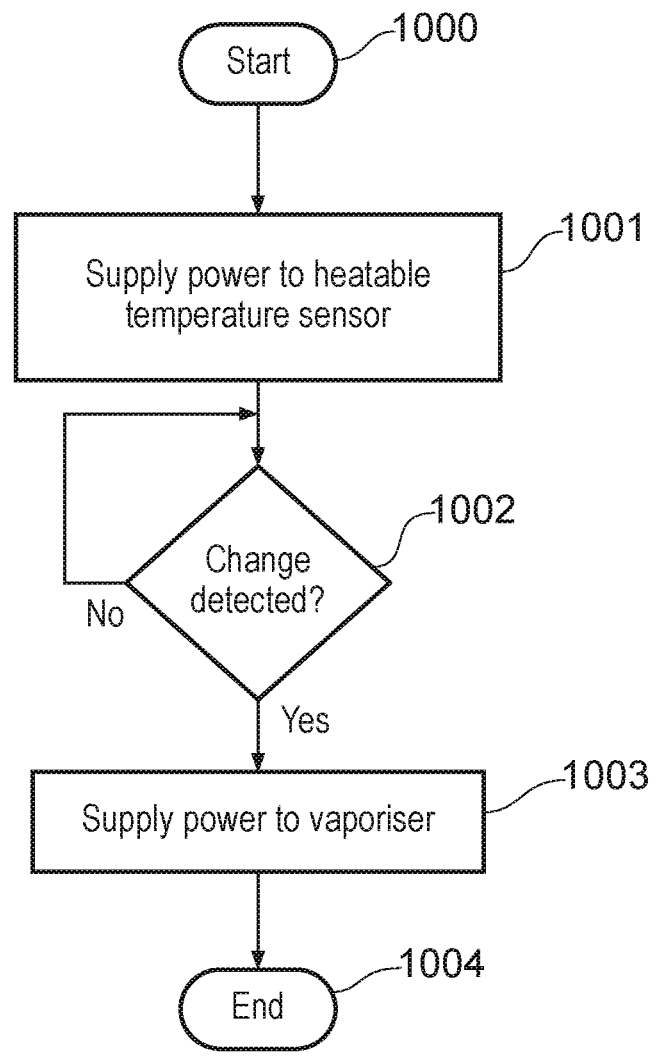
FIG. 10 shows a flow chart illustrating a process according to the present technique.

FIG. 10 shows a flow chart illustrating a process according to an embodiment of the present technique. The process is carried out by the microcontroller 555. The process starts at 1000. At 1001, the microcontroller 555 causes power to be supplied to the temperature sensor 215 to heat the temperature sensor 215. At 1002, it is determined whether a predetermined change in a parameter (such as R, I, V or even the heated temperature $T_H$ itself, when the temperature sensor 215 is a heatable thermistor) related to the heated temperature of the temperature sensor 215 has occurred. The predetermined change may be a change amount or a rate of change of the parameter, for example, as previously discussed. In the case that the predetermined change is not detected to have occurred, 1002 is repeated. On the other hand, in the case that the predetermined change is detected to have occurred, the process continues to 1003, in which the microcontroller 555 causes power to be supplied to the vaporizer (which, in the described in embodiments, is heater 365). The process then ends at 1004.

The approach described herein can be extended to a range of electronic vapor provision systems, including, for example, the type of inhaler described in US 2011/0226236, and also heat-not-burn devices (which may include some plant matter or extract, for example, tobacco leaf, which is then heated or provided with steam to produce the desired vapor) that likewise include an electronic vaporizer. In general, it will be appreciated that the present technique could be applied to an electronic vapor provision system configured for use with any aerosol precursor material or aerosol source, such as a reservoir of a source liquid containing a formulation, typically including nicotine and often flavorants, or a solid material such as a tobacco-based product, from which an aerosol is generated for inhalation by a user, for example through atomization/heat vaporization.

In order to address various issues and advance the art, the entirety of this disclosure shows by way of illustration various embodiments in which the claimed invention(s) may be practiced and provide for superior electronic vapor provision systems. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. An electronic vapor provision system comprising:
   a vaporizer for vaporizing aerosol precursor material for inhalation by a user of the electronic vapor provision system;
   a power supply for supplying power to the vaporizer;
   a wall defining an air flow path along which air travels through the electronic vapor provision system when a user inhales or exhales on the electronic vapor provision system;
   a heatable temperature sensor mounted in the air flow path adjacent a portion of the wall of the air flow path; and
   a controller configured to cause power to be supplied to the heatable temperature sensor to heat the heatable temperature sensor to a temperature above ambient temperature and to cause power to be supplied to the vaporizer to vaporize the aerosol precursor material in response to detecting a change in temperature of the heatable temperature sensor;
   wherein the air flow path is arranged such that, during inhalation by the user, air travelling along the air flow path is directed at the heatable temperature sensor in a direction that is towards the portion of the wal adjacent to which the heatable temperature sensor is mounted so as to disrupt the airflow around the heatable temperature sensor.

2. The electronic vapor provision system according to claim 1, wherein:
   the air flow path is arranged such that, when the user inhales on the electronic vapor provision system, air travels through the air flow path and is directed at the heatable temperature sensor in a direction that is towards the portion of the wall adjacent to which the heatable temperature sensor is mounted so as to disrupt the airflow around the heatable temperature sensor, and the controller is configured to cause power to be supplied to the vaporizer to vaporize the aerosol precursor material only when one of an amount of the detected change in temperature of the heatable temperature sensor or the rate of the detected change in temperature of the heatable temperature sensor exceeds a predetermined threshold.

3. The electronic vapor provision system according to claim 1, comprising:
   a further temperature sensor mounted in the air flow path adjacent a further portion of the wall of the air flow path;
   wherein:
      the air flow path is arranged such that:
         when the user exhales on the electronic vapor provision system, air travels through the air flow path and is not directed at the heatable temperature sensor in a direction that is towards the portion of the wall adjacent to which the heatable temperature sensor is mounted so as to disrupt the airflow around the heatable temperature sensor and is directed at the further temperature sensor in a direction towards the further portion of the wall adjacent to which the further temperature sensor is mounted so as to disrupt the airflow around the further temperature sensor, and
         when the user inhales on the electronic vapor provision system, air travels through the air flow path and is directed at the heatable temperature sensor in a direction that is towards the portion of the wall adjacent to which the heatable temperature sensor is mounted so as to disrupt the airflow around the heatable temperature sensor and is not directed at the further temperature sensor in a direction towards the further portion of the wall adjacent to which the further temperature sensor is mounted so as to disrupt the airflow around the further temperature sensor; and
      the controller is configured to:
         cause power to be supplied to the further temperature sensor to heat the further temperature sensor, and
         cause power to be supplied to the vaporizer to vaporize the aerosol precursor material only when one of an amount of a detected change in the temperature of the heatable temperature sensor exceeds an amount of a detected change in the temperature of the further temperature sensor or a rate of a detected change in the temperature of the heatable temperature sensor exceeds a rate of a detected change in the temperature of the further temperature sensor.

4. The electronic vapor provision system according to claim 2, wherein, upon initially detecting a change in the temperature of the heatable temperature sensor, the controller is configured to cause power to be supplied to the vaporizer to vaporize the aerosol precursor material until the one of the amount of the detected change in the temperature of the heatable temperature sensor or the rate of the detected change in the temperature of the heatable temperature sensor has been determined.

5. The electronic vapor provision system according to claim 3, wherein, upon initially detecting a change in the temperature of one of the heatable temperature sensor and further temperature sensor, the controller is configured to cause power to be supplied to the vaporizer to vaporize the aerosol precursor material until the one of the amount of the detected change in the temperature of the one of the heatable temperature sensor and further temperature sensor or the rate of the detected change in the temperature of the one of the heatable temperature sensor and further temperature sensor has been determined.

6. The electronic vapor provision system according to claim 3, wherein the further temperature sensor is a thermistor.

7. The electronic vapor provision system according to claim 6, wherein the thermistor is a surface mount thermistor.

8. The electronic vapor provision system according to claim 1, wherein the heatable temperature sensor is a thermistor.

9. The electronic vapor provision system according to claim 8, wherein the thermistor is a surface mount thermistor.

10. The electronic vapor provision system according to claim 1, wherein the controller is configured to control the amount of power supplied to the vaporizer to vaporize the aerosol precursor material based on one of an amount of the detected change in the temperature of the heatable temperature sensor and a rate of the detected change in the temperature of the heatable temperature sensor.

11. The electronic vapor provision system according to claim 3, wherein the controller is configured to control the amount of power supplied to the vaporizer to vaporize the aerosol precursor material based on one of an amount of the detected change in the temperature of one of the heatable temperature sensor and further temperature sensor and a rate of the detected change in the temperature of the one of the heatable temperature sensor and further temperature sensor.

12. The electronic vapor provision system according to claim 10, wherein the controller is configured to further control the amount of power supplied to the vaporizer based on a value of the ambient temperature of the electronic vapor provision system.

13. The electronic vapor provision system according to claim 12, wherein the controller is configured to detect the ambient temperature using the heatable temperature sensor prior to causing power to be supplied to the heatable temperature sensor to heat the heatable temperature sensor.

14. The electronic vapor provision system according to claim 11, wherein the controller is configured to further control the amount of power supplied to the vaporizer based on a value of the ambient temperature of the electronic vapor provision system.

15. The electronic vapor provision system according to claim 14, wherein the controller is configured to detect the ambient temperature using one of the heatable temperature sensor and further temperature sensor prior to causing power to be supplied to the one of the heatable temperature sensor and further temperature sensor to heat the heatable temperature sensor.

16. The electronic vapor provision system according to claim 12, further comprising an independent ambient temperature sensor configured to measure the ambient temperature.

17. The electronic vapor provision system according to claim 1, wherein the controller is configured to, upon causing power to stop being supplied to the vaporizer to vaporize the aerosol precursor material, cause power to stop being supplied to the heatable temperature sensor to heat the heatable temperature sensor for a predetermined time period.

18. The electronic vapor provision system according to claim 3, wherein the controller is configured to, upon causing power to stop being supplied to the vaporizer to vaporize the aerosol precursor material, cause power to stop being supplied to one of the heatable temperature sensor and further temperature sensor to heat the one of the heatable temperature sensor and further temperature sensor for a predetermined time period.

19. The electronic vapor provision system according to claim 1, wherein the vaporizer is a heater which is supplied with power from the power supply to heat and thereby vaporize the aerosol precursor material for inhalation by the user.

20. The electronic vapor provision system according to claim 1, wherein the aerosol precursor material is a liquid comprising nicotine.

21. A method of operating an electronic vapor provision system comprising a vaporizer for vaporizing aerosol precursor material for inhalation by a user of the electronic vapor provision system, a power supply for supplying power to the vaporizer, a wall defining an air flow path along which air travels through the electronic vapor provision system when a user inhales or exhales on the electronic vapor provision system, and a heatable temperature sensor mounted in the air flow path adjacent a portion of the wall of the air flow path, the method comprising:
    causing power to be supplied to the heatable temperature sensor to heat the heatable temperature sensor to a temperature above ambient temperature; and
    causing power to be supplied to the vaporizer to vaporize the aerosol precursor material in response to detecting a change in temperature of the heatable temperature sensor;
    wherein the air flow path is arranged such that, during inhalation by the user, air travelling along the air flow path is directed at the heatable temperature sensor in a direction that is towards the portion of the wall adjacent to which the heatable temperature sensor is mounted so as to disrupt the airflow around the heatable temperature sensor.

* * * * *